(12) United States Patent
Krejcarek

(10) Patent No.: US 12,322,270 B2
(45) Date of Patent: *Jun. 3, 2025

(54) METHOD OF FABRICATION OF LOW-POWER ELECTRONIC TAPE FOR TRACKING ITEMS

(71) Applicant: Reelables, Inc., San Francisco, CA (US)

(72) Inventor: Brian Grant Krejcarek, Seattle, WA (US)

(73) Assignee: REELABLES, INC., Seattle, WA (US)

( * ) Notice: Subject to any disclaimer, the term of this patent is extended or adjusted under 35 U.S.C. 154(b) by 222 days.

This patent is subject to a terminal disclaimer.

(21) Appl. No.: 17/849,482

(22) Filed: Jun. 24, 2022

(65) Prior Publication Data

US 2022/0319301 A1 Oct. 6, 2022

Related U.S. Application Data

(63) Continuation-in-part of application No. 17/187,704, filed on Feb. 26, 2021, now Pat. No. 11,594,120, (Continued)

(51) Int. Cl.
G08B 21/24 (2006.01)
G08B 5/22 (2006.01)
H04W 4/80 (2018.01)

(52) U.S. Cl.
CPC ............. *G08B 21/24* (2013.01); *G08B 5/223* (2013.01); *H04W 4/80* (2018.02)

(58) Field of Classification Search
CPC ......... G08B 21/24; G08B 5/223; H04W 4/80; Y02D 30/70
(Continued)

(56) References Cited

U.S. PATENT DOCUMENTS 6,614,392 B2 * 9/2003 Howard ................. G01S 19/09
342/357.31
8,294,040 B2 10/2012 Shimizu
(Continued)

FOREIGN PATENT DOCUMENTS

CN 206058255 U 3/2017
CN 206162636 U 5/2017
(Continued)

OTHER PUBLICATIONS

International Search Report in PCT Application No. PCT/US23/69028, mailed Sep. 28, 2023.
(Continued)

*Primary Examiner* — Omar Casillashernandez
(74) *Attorney, Agent, or Firm* — PATENT LAW WORKS LLP

(57) ABSTRACT

A wireless communication tape, dispenser of the same and methods of usage of the wireless tape and the dispenser in asset tracking applications are disclosed. The wireless communication tape can be manufactured in an ultrathin form factor by laminating a stack of layers to impart functionality to the wireless communication tape. Methods of use and operation of the wireless communication tape are disclosed to save battery resources of the communication tape.

29 Claims, 31 Drawing Sheets

Related U.S. Application Data which is a continuation of application No. 16/596,698, filed on Oct. 8, 2019, now Pat. No. 10,964,197.

(60) Provisional application No. 62/742,935, filed on Oct. 9, 2018.

(58) Field of Classification Search
USPC .................................................. 340/539.11
See application file for complete search history.

(56) References Cited

U.S. PATENT DOCUMENTS

| | | | |
|---|---|---|---|
| 8,836,533 B2 | 9/2014 | Timm | |
| 9,092,814 B2 | 7/2015 | Timm | |
| 9,648,751 B2 | 5/2017 | Depres | |
| 10,108,898 B1 | 10/2018 | Ballam | |
| 10,153,657 B1 | 12/2018 | Koifman | |
| 2004/0121231 A1* | 6/2004 | Kim | H01M 50/553 |
| | | | 429/185 |
| 2005/0079418 A1 | 4/2005 | Kelley | |
| 2008/0061972 A1 | 3/2008 | Hwang | |
| 2008/0117048 A1 | 5/2008 | Rachwalski | |
| 2008/0159364 A1 | 7/2008 | Rofougaran | |
| 2008/0268344 A1* | 10/2008 | Kim | H01M 50/55 |
| | | | 429/246 |
| 2011/0135849 A1 | 6/2011 | Kruesemann | |
| 2011/0293851 A1 | 12/2011 | Bollstrom | |
| 2012/0067961 A1 | 3/2012 | Mauricia | |
| 2013/0074330 A1* | 3/2013 | Tucholski | H01M 4/42 |
| | | | 29/832 |
| 2015/0129666 A1 | 5/2015 | Butler | |
| 2015/0201694 A1 | 7/2015 | Boyce | |
| 2015/0208513 A1 | 7/2015 | Hirano | |
| 2015/0296612 A1 | 10/2015 | Gumbiowski | |
| 2018/0025603 A1* | 1/2018 | Tyler | H04W 52/0216 |
| | | | 340/572.1 |
| 2018/0037009 A1 | 2/2018 | Carvalho Gomes | |
| 2018/0240376 A1 | 8/2018 | Caironi | |
| 2019/0069788 A1 | 3/2019 | Coleman | |
| 2019/0187456 A1 | 6/2019 | Filo | |
| 2020/0092683 A1* | 3/2020 | Fyfe | H04L 67/125 |
| 2020/0111343 A1* | 4/2020 | Krejcarek | H04W 4/80 |
| 2020/0387766 A1* | 12/2020 | Seitz | G06K 19/0723 |
| 2022/0245420 A1 | 8/2022 | Yazaki | |
| 2022/0271816 A1* | 8/2022 | Alijan | H04B 1/0475 |
| 2022/0319301 A1 | 10/2022 | Krejcarek | |
| 2024/0029589 A1 | 1/2024 | Krejcarek | |

FOREIGN PATENT DOCUMENTS

| | | | |
|---|---|---|---|
| CN | 107992924 A | 5/2018 | |
| EP | 1995053 A1 | 11/2008 | |
| WO | 2006076667 A2 | 7/2006 | |
| WO | 20100041173 | 4/2010 | |
| WO | 2013104520 A1 | 7/2013 | |
| WO | 2015143202 A1 | 9/2015 | |
| WO | 2017046699 A1 | 3/2017 | |
| WO | 2017084760 A1 | 5/2017 | |
| WO | 2018039558 A1 | 3/2018 | |
| WO | 2018210977 A1 | 11/2018 | |
| WO | 2019055161 A1 | 3/2019 | |
| WO | 20210206753 | 10/2021 | |
| WO | WO-2021206753 A1 * | 10/2021 | G06K 19/025 |

OTHER PUBLICATIONS

International Search Report in PCT Application No. PCT/US19/55272, mailed Jan. 6, 2020.

International Search Report Issued for PCT/US24/35342, mailed on Dec. 10, 2024, 16 pgs.

International Preliminary Report on Patentability Issued for PCT/US23/069028, mailed on Jan. 2, 2025, 10 pgs.

* cited by examiner

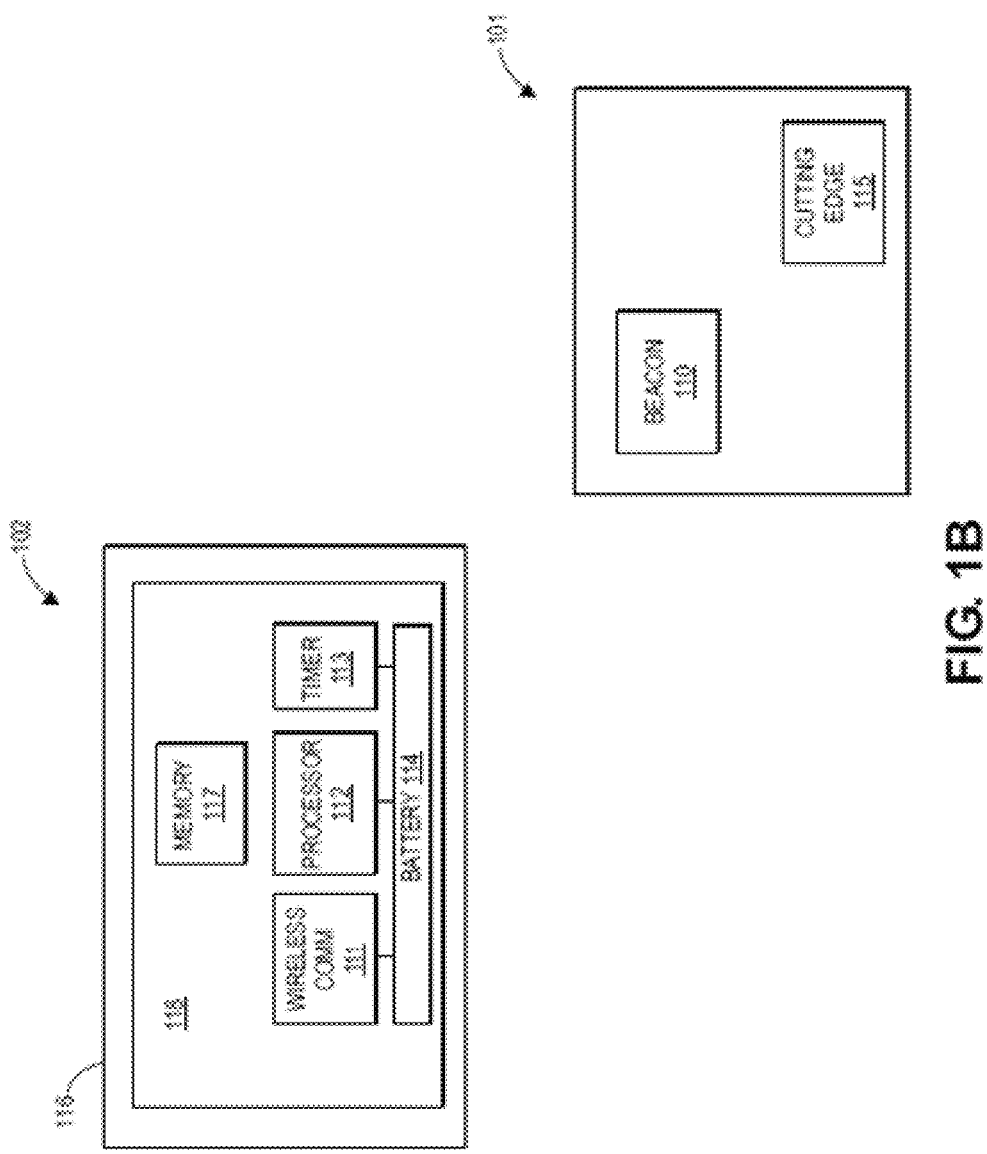

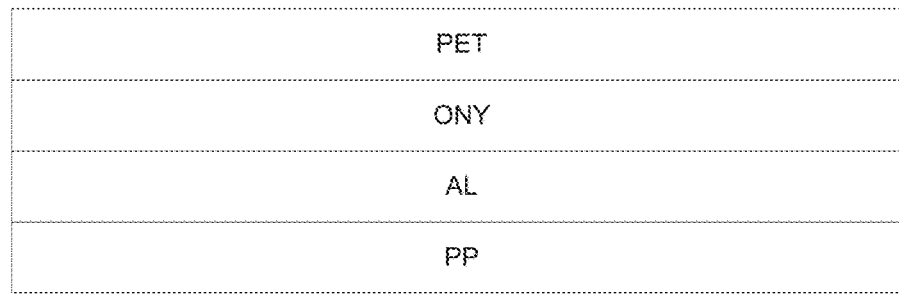
FIG. 11A
FIG. 11B
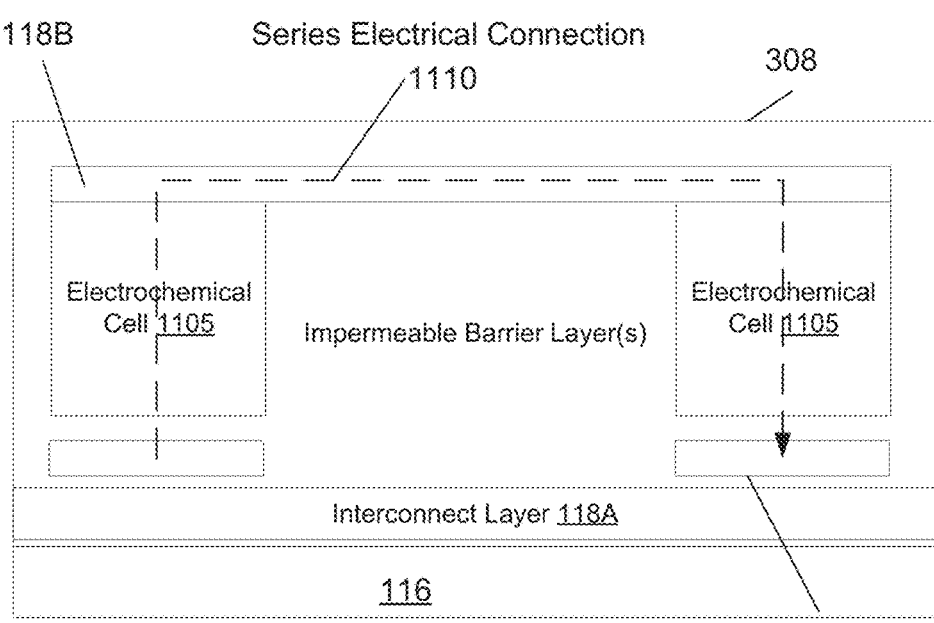
FIG. 11C

METHOD OF FABRICATION OF LOW-POWER ELECTRONIC TAPE FOR TRACKING ITEMS

CROSS-REFERENCE TO RELATED APPLICATIONS

This application is a continuation-in-part of U.S. patent application Ser. No. 17/187,704 filed on Feb. 26, 2021, entitled "LOW-POWER ELECTRONIC TAPE FOR TRACKING ITEMS, which is a continuation of U.S. patent application Ser. No. 16/596,698, filed on Oct. 8, 2019, entitled "LOW-POWER ELECTRONIC TAPE FOR TRACKING ITEMS", which claims the benefit of priority of U.S. Provisional Application No. 62/742,935 filed on Oct. 9, 2018 entitled "LOW-POWER ELECTRONIC TAPE FOR TRACKING ITEMS," the content of which is incorporated herein by reference in its entirety and should be considered a part of this specification.

BACKGROUND

Field

This invention relates generally to the field of wireless communication and more particularly to ultrathin Bluetooth labels used for asset tracking.

Description of the Related Art

Ability to track objects can have many personal and commercial uses. For example, nearly every business that maintains inventory can use an improved system to track objects within its inventory. Many service businesses can also benefit from a robust object tracking system. Plumbers, electricians and IT professionals carry tools from a base-station to a jobsite. Often the jobsite can be a considerable distance away from the base-station. Forgetting items either at the jobsite or at the base-station can be costly in terms of replacement tools, parts and loss of productivity. The same issues can be present in daily lives of individuals when needed items are left behind. For example, a traveler forgetting to take her passport to the airport, or a student forgetting to take homework to school, or a new mother forgetting to take supplies for a new born outside her home are examples of situations when forgetting items can inconvenience lives and cause loss of money and time. In other situations, forgetting some items can have more severe consequences. For example, a segment of the population, such as patients with diabetes and heart problems, need to remember to have life-saving medicine with them at all times.

Modern approaches to reminding individuals to take important items with them have included reliance on electronic note taking software designed to keep lists. These solutions often lack the automation and connectivity to make them effective. For example, a tradesman can make a checklist of items to take on a jobsite, but on some days when he is rushed, he may forget to consult the checklist and items can be left behind. Timers and alarms associated with these programs can also be ineffective because the software is not connected to the items that are to be tracked and software has no knowledge of the whereabouts of the item in relation to the individual.

Other approaches include use of products, termed "trackers". Trackers can be fairly expensive items and can come in formfactors that limit their application for tracking objects. For example, they can be in the form of a key-ring or similar devices that can be affixed to an item of interest. For some items, such as medicine bottles, passports or some tools, the trackers' shape and formfactor prevent reliable attachment to an item of interest. Trackers can include a speaker device and can pair with the user's smart phone. If the user realizes the tracker-affixed item is lost, the user can trigger the tracker to play an audible sound or alarm to assist the user in finding the item. These solutions also do not improve the situation when the user has left the area where the object was left behind, and the user has to make a return trip to retrieve the item.

Object tracking can also be performed by using radio frequency identification (RFID) technology, where an RFID label can be affixed to an item of interest and an RFID reader can be used to detect the RFID label. However, these solutions require using specialized and often expensive RFID readers to engage and interact with RFID labels that are attached or affixed to an item of interest, especially in the case of ultrathin RFID labels. Furthermore, object tracking solutions based on passive RFID labels can still rely on human intervention to bring the labels within the range of an RFID reader to enable scanning and tracking of the label. As a result, the ultrathin passive RFIDs can have limited application in object tracking, where the user is to be reminded of the object. In the case of active RFID labels, the bulk of the internal battery and other components and their general formfactor can make them poor candidates for object tracking in the case of many important objects of interest.

Consequently, there is a need for an object tracking system that connects a user's existing devices (such as her smart phone or tablet) to the objects that the user needs to track. If smart labels are used, they need to be in a formfactor that can easily be affixed to a multitude of objects. Furthermore, the software component of the object tracking system needs to generate reminders and alerts based on the characteristics of the object and the context of the activities and requirements of the user of the object tracking system.

SUMMARY

In one aspect, a wireless tape is disclosed that includes wireless tracking labels, which may be formed in a reel-to-reel process and later separated to form individual wireless tracking labels. The wireless tape includes: a polyester substrate; an interconnect layer coated on the polyester substrate and patterned to electrically couple a plurality of electrical circuits, wherein the electrical circuits are formed and/or bonded on the interconnect layer, and comprise an RF processor, an RF communication circuit configured to broadcast beacons at a broadcast frequency; and a battery comprising a cathode and anode layer and a battery pouch disposed on the interconnect layer, wherein the interconnect layer comprises the cathode layer, and wherein the RF processor is configured to: receive the electrical signal; determine a rate of change of the electrical signal; and modulate the broadcast frequency, at least in part, based on the determined rate of change of the electrical signal. In some implementations, the RF processor is a Bluetooth processor and the RF communication circuit is Bluetooth processor.

In some implementations, the Bluetooth processor is further configured to: select a sequence of broadcasting signals, comprising a predetermined number of broadcasting signals; modify the broadcasting signals in the sequence based on a predetermined modification algorithm; and signal the Bluetooth communication circuit to transmit the sequence of the modified broadcasting signals to a smart device.

In one implementation, the smart device receives and routes the sequence of modified broadcasting signals to a wireless tape application running on the smart device and the wireless tape application reconstructs unmodified broadcasting signals from the received modified broadcasting signals, based on the predetermined modification algorithm.

In another implementation, the predetermined modification algorithm comprises modifying a MAC address and/or a UUID in the broadcasting signals.

In some implementations, the wireless tape further includes: a coil antenna formed and/or disposed on the interconnect layer and tuned to resonate at a frequency generated by a transceiver of a smart device; and wherein the coil antenna is electrically coupled to a GPIO port of the Bluetooth processor, wherein the coil antenna is configured to receive RF energy field generated by the transceiver and convert the RF energy to an AC signal, and transmit the AC signal to the GPIO port of the Bluetooth processor waking up the Bluetooth processor, and wherein the Bluetooth processor begins transmitting a wireless beacon comprising a startup sequence, having a predefined power level and an identifier of the Bluetooth processor and the Bluetooth communication circuit.

In some implementations, the RF processor further comprises an ADC configured to receive voltages from a conductive surface of the wireless tape and the RF processor is further configured to determine a rate of change of the voltages from the conductive surface and modulate the broadcast frequency, at least in part, based on the determined rate of change of the voltages from the conductive plane.

In another implementation, the RF processor further comprises an ADC configured to receive voltages from a pair of parallel conductive surfaces of the wireless tape and the RF processor is further configured to modulate the broadcast frequency, at least partly, based on the difference between voltages received from the parallel conductive surfaces.

In one implementation, the wireless tape further includes a first conductive plane and a second conductive plane formed on the interconnect layer and forming a part of an edge of the wireless tape, wherein the interconnect layer is further patterned to electrically couple the first conductive plane to a terminal of the battery and the second conductive plane to a GPIO port of the Bluetooth processor.

In another implementation, the wireless tape further includes a first conductive plane and a second conductive plane formed on opposite edges of the wireless tape and on an external surface of the wireless tape, wherein the interconnect layer is further patterned to connect the first and second conductive planes to terminals of a GPIO port of the Bluetooth processor, and wherein the first and second conductive planes comprise an electrically conductive adhesive layer.

In some implementations, a dispenser is configured to dispense the wireless tape.

In another aspect, a method is disclosed. The method includes: providing a polyester substrate; coating an interconnect layer on the polyester substrate and patterning the interconnect layer to electrically couple a plurality of electrical circuits, wherein the electrical circuits are formed and/or bonded on the interconnect layer, and comprise a Bluetooth processor, a Bluetooth communication circuit configured to broadcast beacons at a broadcast frequency, and an energy harvesting circuit; providing a photovoltaic layer coupled to the energy harvesting circuit, wherein the photovoltaic layer and the energy harvesting circuit are configured to generate an electrical signal from converting light to the electrical signal; and forming a layered battery comprising a cathode and anode layer and a battery pouch disposed on the interconnect layer, wherein the interconnect layer comprises the cathode layer, and wherein the Bluetooth processor is configured to: receive the electrical signal; determine a rate of change of the electrical signal; and modulate the broadcast frequency, at least in part, based on the determined rate of change of the electrical signal.

In some implementations, the Bluetooth processor is further configured to: select a sequence of broadcasting signals, comprising a predetermined number of broadcasting signals; modify the broadcasting signals in the sequence based on a predetermined modification algorithm; and signal the Bluetooth communication circuit to transmit the sequence of the modified broadcasting signals to a smart device.

In another implementation, the smart device receives and routes the sequence of modified broadcasting signals to a wireless tape application running on the smart device and the wireless tape application reconstructs unmodified broadcasting signals from the received modified broadcasting signals, based on the predetermined modification algorithm.

In one implementation, the predetermined modification algorithm comprises modifying a MAC address and/or a UUID in the broadcasting signals.

In some implementations, the method further includes: forming and/or disposing a coil antenna on the interconnect layer; tuning the coil antenna to resonate at a frequency generated by a transceiver of a smart device; and electrically coupling the coil antenna, and a GPIO port of the Bluetooth processor, wherein the coil antenna is configured to receive RF energy field generated by the transceiver and convert the RF energy to an AC signal, and transmit the AC signal to the GPIO port of the Bluetooth processor waking up the Bluetooth processor, and wherein the Bluetooth processor begins transmitting a wireless beacon comprising a startup sequence, having a predefined power level and an identifier of the Bluetooth processor and the Bluetooth communication circuit.

In one implementation, the Bluetooth processor further comprises an ADC configured to receive voltages from a conductive surface of the wireless tape and the Bluetooth processor is further configured to determine a rate of change of the voltages from the conductive surface and modulate the broadcast frequency, at least in part, based on the determined rate of change of the voltages from the conductive plane.

In another implementation, the Bluetooth processor further comprises an ADC configured to receive voltages from a pair of parallel conductive surfaces of the wireless tape and the Bluetooth processor is further configured to modulate the broadcast frequency, at least partly, based on the difference between voltages received from the parallel conductive surfaces.

In some implementations, the method further includes forming a first conductive plane and a second conductive plane on the interconnect layer and as a part of an edge of the wireless tape; and further patterning the interconnect layer to electrically couple the first conductive plane to a terminal of the battery and the second conductive plane to a GPIO port of the Bluetooth processor.

In another implementation, the method further includes forming a first conductive plane and a second conductive plane on opposite edges of the wireless tape and on an external surface of the wireless tape; and further patterning the interconnect layer to connect the first and second conductive planes to terminals of a GPIO port of the Bluetooth processor, and wherein the first and second conductive planes comprise an electrically conductive adhesive layer.

In one implementation, a wireless tracking label includes a flexible substrate. An interconnect layer is formed on the flexible substrate and patterned to electrically couple a plurality of electrical circuits including a wireless RF communication processor and a wireless RF communication circuit configured to generate tracking information. A battery is formed on the flexible substrate and includes a cathode layer and an anode layer, with a battery pouch disposed on the interconnect layer, the battery pouch containing electrochemical components of the battery. In some implementations, the battery includes a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$. In some implementations, the battery comprises two electrochemical cells in series formed by a planar process with vertical flow of ions in each electrochemical cell with a planar conductive layer coupling the two electrochemical cells in series. Alternatively, in some implementations, the battery comprises two electrochemical cells in series formed by a coplanar process with each electrochemical cell having a lateral flow of ions between an interdigitated cathode and anode with a planar conductive layer coupling the two electrochemical cells in series.

In one implementation, wireless tracking label tape includes a flexible substrate. An interconnect layer is formed on the flexible substrate and patterned to electrically couple a plurality of electrical circuits including a wireless RF communication processor and a wireless RF communication circuit configured to generate tracking information. A battery formed on the flexible substrate includes a cathode layer and an anode layer, with a battery pouch disposed on the interconnect layer The battery pouch contains the electrochemical components of the battery. In one implementation, the wireless RF communication processor is a Bluetooth processor and the wireless RF communication circuit is a Bluetooth communication circuit, and the wireless RF communication processor and the wireless RF communication circuit are configured to generate broadcast beacons at a broadcast frequency. In one implementation, the battery is coated onto the interconnect layer. In one implementation, the battery is a layered structure. In one implementation, the battery is printed onto the interconnect layer. In one implementation, the wireless RF communication processor and the wireless RF communication circuit are configured to stay in a power-saving sleep mode during storage until activated for use. In one implementation, the wireless tracking label tape is formed in a reel-to-reel process with the wireless RF communication processor and the wireless RF communication circuit of at least one individual wireless tracking label is activated subsequent to separation from a reel. In one implementation, the wireless tracking label tape includes a coil antenna tuned to resonate at a wake up frequency and generate a wake up voltage in response to engaging with a device having a transceiver emitting a wireless signal at the wake up frequency. In one implementation, the wireless tracking label tape includes a coil antenna to harvest energy from engaging with HF RFID or NFC reader and in response generate a wake up voltage for the wireless RF communication processor and the wireless RF communication circuit.

In one implementation of the wireless tacking label tape, the wireless RF communication processor is configured to: receive an electrical signal; determine a rate of change of the electrical signal; and modulate a broadcast frequency, at least in part, based on the determined rate of change of the electrical signal.

In one implementation, a wireless tracking label tape includes a flexible substrate. An interconnect layer is formed on the flexible substrate and patterned to electrically couple a plurality of electrical circuits including a wireless RF communication processor and a wireless RF communication circuit configured to generate tracking information. A battery is printed onto the interconnect layer and include a cathode layer and an anode layer. A battery pouch disposed on the interconnect layer, the battery pouch containing electrochemical components of the battery. The wireless tracking label tape is formed in a reel-to-reel process with the wireless RF communication processor and the wireless RF communication circuit of at least one individual wireless tracking label activated subsequent to separation from a reel. In one implementation, the wireless tracking label tape includes a coil antenna tuned to resonate at a wake up frequency and generate a wake up voltage in response to engaging with a user device having a transceiver emitting a wireless signal at the wake up frequency. In one implementation, the wireless tracking label tape includes a coil antenna to harvest energy from engaging with a n HF RFID or an NFC reader and in response generate a wake up voltage for the wireless RF communication processor and the wireless RF communication circuit. In one implementation, the wireless RF communication processor and the wireless RF communication circuit comprises a Bluetooth processor and a Bluetooth communication circuit configured to generate broadcast beacons at a broadcast frequency.

In one implementation, a wireless tracking label tape has a flexible substrate. An interconnect layer formed on the flexible substrate is patterned to electrically couple a plurality of electrical circuits including a RF communication processor and a RF communication circuit configured to generate broadcast beacons at a broadcast frequency. A battery formed on the flexible substrate has a cathode coating and an anode coating. A battery pouch is form on the interconnect layer, the battery pouch containing electrochemical components of the battery to form a barrier impermeable to gases or moisture deleterious to battery lifetime. The electrolyte chemicals of the battery include at least one member from the group consisting of $ZnSO_4$, $ZnCl_2$, $MnSO_4$, and $AlCl_4$. In one implementation, the interconnect layer comprises an aluminum layer. In one implementation, the RF communication processor and the RF communication circuit are configured to stay in a power-saving sleep mode during storage until activated for use. In one implementation, the wireless tracking label tape is formed in a reel-to-reel process with the RF communication processor and the RF communication circuit of at least one individual wireless tracking label activated subsequent to separation from a reel. In one implementation, the wireless tracking label tape includes coil antenna tuned to resonate at a wake up frequency and generate a wake up voltage in response to engaging with a user device having a transceiver emitting a wireless signal at the wake up frequency. In one implementation, the battery includes at least two electrochemical cells in series formed by a planar process with vertical flow of ions in each electrochemical cell with a planar conductive layer coupling the two electrochemical cells in series. In one implementation, the battery comprises at least two electrochemical cells in series formed by a coplanar process with each electrochemical cell having a lateral flow of ions between an interdigitated cathode and anode, with a planar conductive layer coupling the two electrochemical cells in series. In one implementation, the battery comprises 3 electrochemical cells in series with an electrical trace formed on the flexible substrate electrically coupling a top layer to a bottom layer.

In one implementation of a method of fabricating a wireless tracking label tape, the method includes: forming a sequence of patterned anode and cathode battery layer sections into a first section and a second section on a flexible substrate. The first second and the second section are arranged on opposite sides of a fold line. At least one conductive trace is formed crossing the fold line between the first and second section. The method includes folding the flexible substrate along a pre-selected fold line to form a battery housed in a battery pouch having in series at least 3 electrochemical cells of the battery. The method includes mounting a RF communication chip to the flexible substrate with an electrical interconnect layer coupling the positive current collector and negative current collector of the battery in series to the RF communication chip with the conductive trace providing an electrical connection to one of the positive current collector and negative current collector.

In one implementation of a method of fabricating a wireless tracking label tape, the method includes: forming on a flexible substrate, cathode layer regions and anode layer regions; patterning a transfer adhesive onto the flexible substrate in 1) a first set of regions to be used as seals; and 2) a second set of regions that have electrolyte; and applying a powdered gel electrolyte to the second set of regions.

BRIEF DESCRIPTION OF THE DRAWINGS

These drawings and the associated description herein are provided to illustrate specific implementations of the invention and are not intended to be limiting.

FIG. 1B is a block diagram illustrating more details of a dispenser and a wireless tape, used in the object tracking system.

FIG. 11A illustrates an example of conventional battery pouch layers.

FIG. 11B illustrates a functional equivalent of battery pouch layers in terms of providing an impermeable barrier.

FIG. 11C is a side view of a battery pouch in accordance with an implementation.

DETAILED DESCRIPTION

Figure 1A:
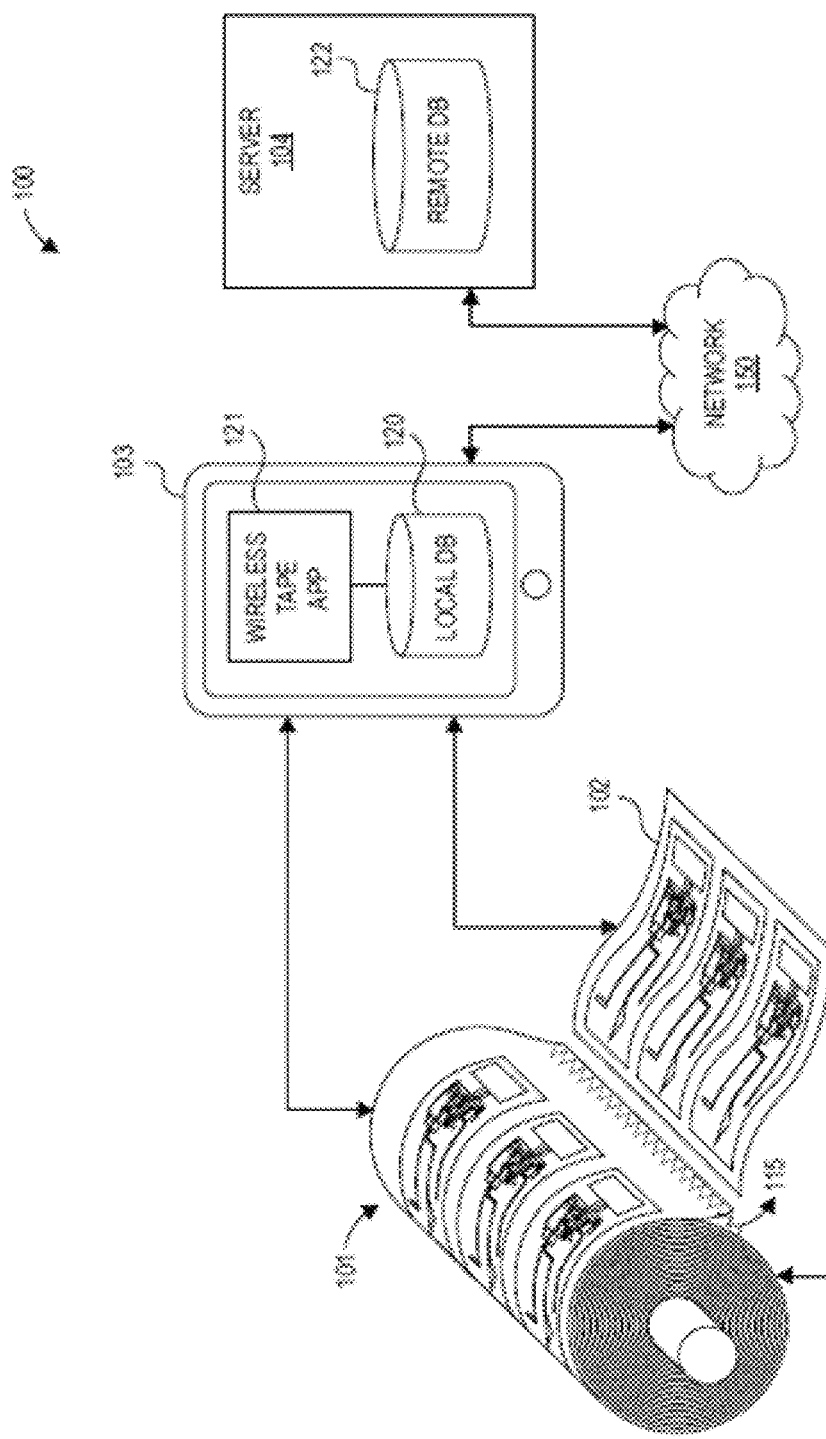
FIG. 1A illustrates an object tracking system according to an implementation.

The following detailed description of certain implementations presents various descriptions of specific implementations of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Object Tracking System 100

FIG. 1A illustrates an object tracking system 100 according to an implementation. A tape dispenser 101 can be used to dispense a wireless tape 102 from a reel of rolled up wireless tape 102. The dispenser 101 can include a cutting means 115 for detaching wireless tape 102 from its reel. The wireless tape 102 can include an adhesive layer allowing it to be affixed to various objects for tracking.

Wireless tape 102 is capable of wireless communication with a smart device 103. The smart device 103 may be any kind of computer system capable of sending and receiving wireless communication to and from the wireless tape 102. Examples include, smart phones, tablets, smart glasses, smart watches, laptops, desktops, personal digital assistant (PDA) devices and others. In one implementation, a wireless tape application 121 may run on the smart device 103 to manage the operations of one or more wireless tapes 102. The wireless tape application 121 can include program instructions to wirelessly communicate with the wireless tapes 102 and a server 104 via a wired or wireless connection with the network 150. The network 150 can be a local-area network, intranet, wide-area network, internet, the Internet, wireless networks, wired networks, a Wi-Fi, Bluetooth, cellular network or other networks. The server 104 may be local to the wireless tape 102 and/or the smart device 103 or it may be at a remote location.

The wireless tape application 121 may maintain and/or manage a local database 120 on the smart device 103. The local database 120 can store various information related to the tracking and management of the wireless tapes 102, such as an identifier for each wireless tape 102, name of an associated item to which the wireless tape is affixed, description and/or images of the item, historical tracking data, an identifier of the owner/custodian of the item and other information as may be desired to be stored in relation to a tracked object. The data stored in local database 120 can additionally, instead or partially be stored in a remote database 122 at the server 104. The server 104 may include the remote database 122, which includes information about additional wireless tapes 102 that may be associated with a user and also other users of wireless tapes 102. Although illustrated as a single server 104, the server 104 may be implemented as a plurality of networked servers.

FIG. 1B is a block diagram illustrating more details of the dispenser 101 and the wireless tape 102. The dispenser 101 may include a beacon 110, comprising a wireless communication system, and a cutting means 115 for detaching pieces of wireless tape 102 from a roll of them. The beacon 110 can be any wireless communication device, capable of transmitting and receiving wireless communication signals to and from the smart device 103. As described earlier, the dispenser 101 can include a cutting means 115 configured to detach wireless tapes 102 during dispensing process. In other implementations, the dispenser 101 can be a housing enclosing a stack of wireless tapes 102 that are folded in a zig-zag pattern on top of one another. A small slit in the housing allows at least one wireless tape 102 to protrude through the slit, giving a user an ability to tear one wireless tape 102 from the rest of the stack. The wireless tapes 102 may be separated by perforation along which a user may tear and separate one wireless tape 102 from the rest. Alternatively, or in addition to perforation, a cutting means at the slit can facilitate separating a wireless tape 102 from the rest.

The wireless tape 102 may comprise a plurality of electronics on a flexible and ultrathin substrate 116. In some implementations, the electronics in the wireless tape 102 can include a wireless communication circuit 111, a processor 112, timer 113, battery 114, and memory module 117, etched, fabricated, bonded or otherwise formed on the substrate 116 and connected through an interconnect layer 118. The interconnect layer 118 can be any electrically conductive material, including aluminum, copper, gold, silver and others. While the circuitry in the wireless tape 102 are shown as discrete components, the persons of ordinary skill in the art can appreciate that these components can be combined in single or multiple chips, depending according to various implementations of the disclosed implementations. For example, when a Bluetooth wireless communication circuit is used to implement the wireless tape 102, the processor 112 can include Bluetooth wireless communication circuitry, and timing circuits, as well as volatile and non-volatile memory to carry out the operations of the wireless tape 102. Alternatively, some components may be integrated, while others can remain as separate components.

Using the Object Tracking System 100

Figure 2A:
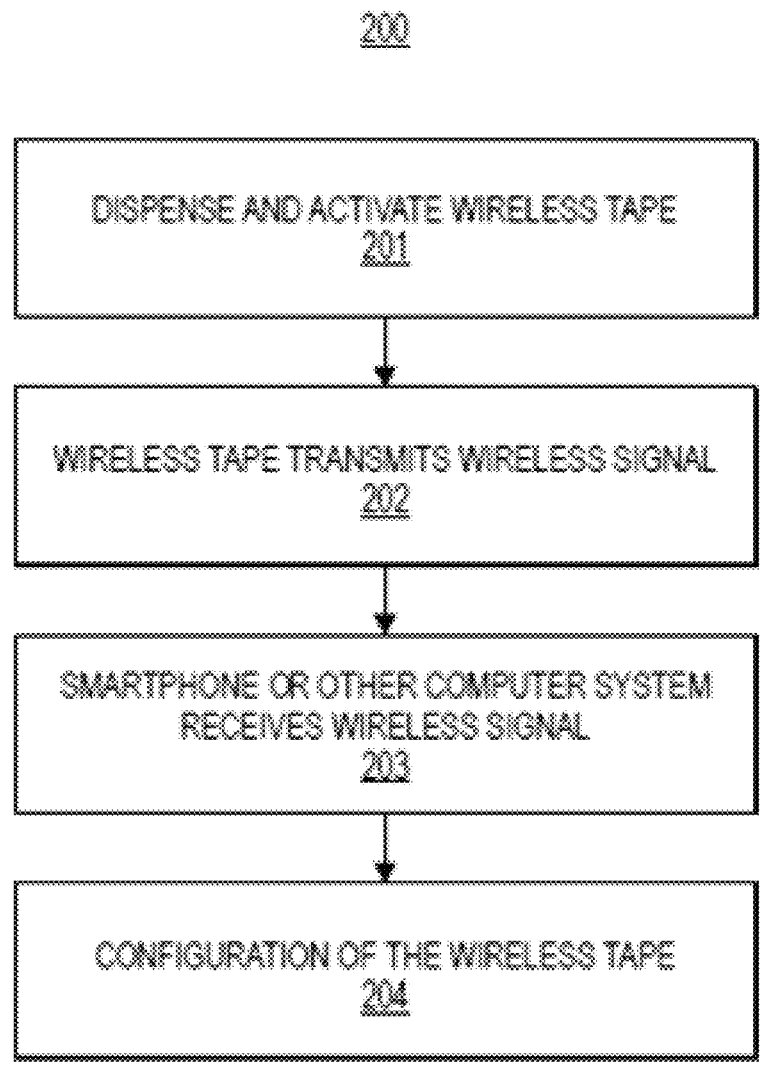
FIG. 2A illustrates an exemplary method of dispensing the wireless tape from the dispenser for tracking objects.

FIG. 2A illustrates an exemplary method 200 of dispensing the wireless tape 102 from dispenser 101 for tracking objects. The wireless tape 102 can be dispensed from a roll of wireless tapes 102 and subsequently attached to an item to be tracked. In step 201, the wireless tape 102 is dispensed from the dispenser 101 and simultaneously activated in a single action. Activation can refer to waking up the processor 112 to send/receive wireless signals, beacons, packets or other wireless messages, using the wireless communication circuit 111. In step 202, the wireless tape 102 may transmit a wireless signal to the smart device 103. The wireless signal may be transmitted at predetermined intervals based on a signal from the timer 113, or may be transmitted based on detected changes in the environment such as through electrostatic detection or other mechanisms like ambient light sensing, accelerometer or other methods, as described herein.

The wireless signal transmitted from the wireless tape 102 may include a unique identifier that is encoded in the memory module 117 of the processor 112, where the identifier is unique among all the wireless tape devices. In step 203, the smart device 103 may receive the wireless signal from the wireless tape 102. In step 204, configuration and setup of the wireless tape 102 may be performed on the smart device 103. The configuration and setup of a wireless tape 102 can include, registering an item to be tracked and associating the item with a unique identifier of the wireless tape 102 and recording the registration and association in one or more local or remote databases, including local database 120 and the remote database 122. The smart device 103 may check for the identifier in the local database 120. If the identifier is located in the local database 120, the smart device 103 may display some or all of the stored information about the wireless tape device and its associated item. Otherwise, the smart device 103 may transmit a request to the server 104 to query the remote database 122 using the identifier. If the identifier is found in the remote database 122, then the information about the wireless tape device is retrieved from the remote database 122 and transmitted from the server 104 to the smart device 103 where the information may be displayed. For example, the smart device 103 may display an indication of the owner of the wireless tape 102. Otherwise, if the wireless tape 102 is not found in the local database 120 nor the remote database 122, then this can indicate that the wireless tape 102 is unassociated with any smart device 103 and can be paired to the smart device 103. The smart device 103 may prompt the user to pair the wireless tape 102 and thereby claim ownership of it. The smart device 103 may display on its screen user interface elements for entering information about the item that the wireless tape 102 is attached to and/or is going to be tracking. The smart device 103 can gather information, such as a name and description of the item. The gathered item information can include text entry, photo of the item, video, voice memo and/or any other data associated with the owner/tracker of the item and/or the item. The gathered item and/or owner data can be stored in the local database 120 and/or in the remote database 122 along with the identifier of the paired wireless tape 102.

Figure 2B:
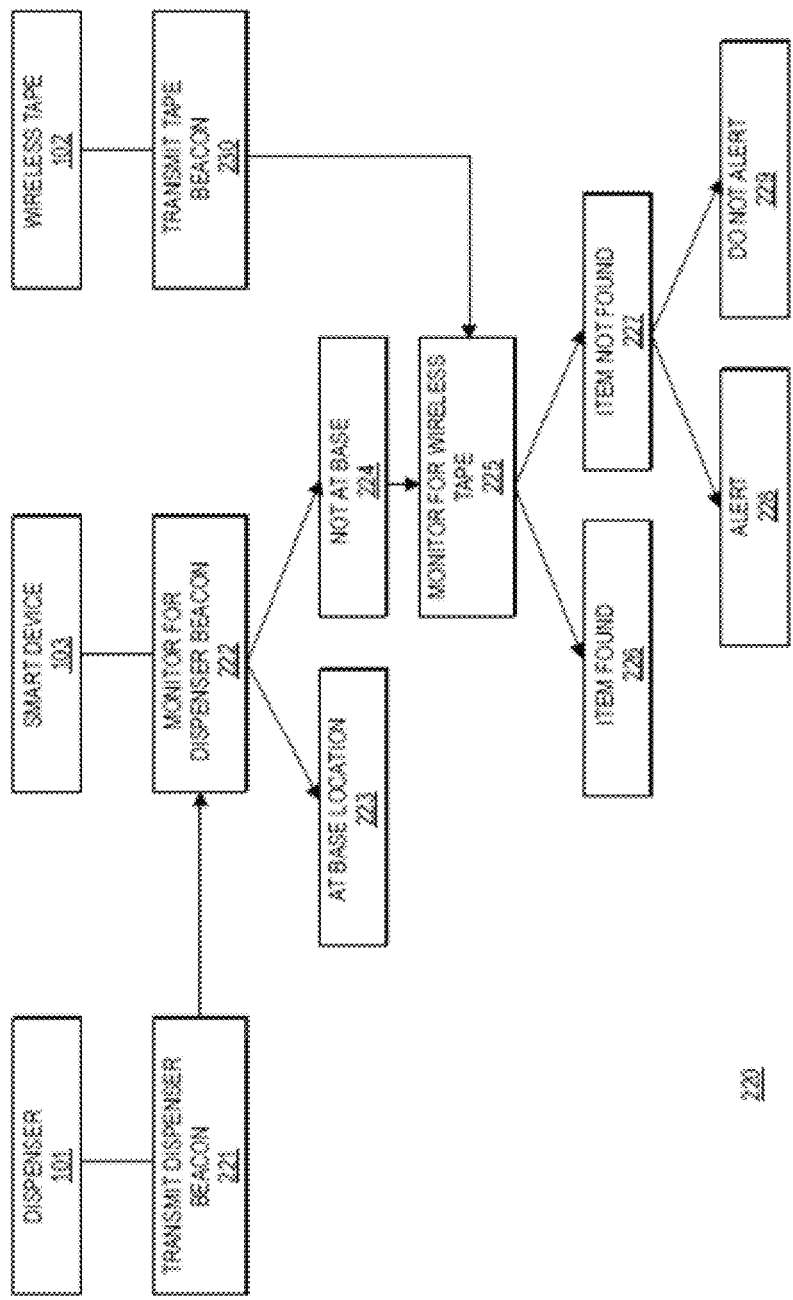
FIG. 2B illustrates an exemplary method of using the object tracking system and determining whether to present an alert.

FIG. 2B illustrates an exemplary method 220 for using the object tracking system 100. The method 220 involves the dispenser 101, the smart device 103, and the wireless tape 102. In step 221, the dispenser transmits a dispenser beacon, using the wireless circuit 110, to indicate the location of the dispenser and a geofence around that location. The dispenser 110 can be activated and send dispenser beacons by a variety of means, for example, the dispenser 110 may be activated when it first dispenses a wireless tape 102. The geofence may comprise geographic coordinates defining a 2D or 3D area on a map surrounding the location of the dispenser 101. The geofence effectively serves to identify a base area where it may not be necessary to track items (e.g., to determine if they are missing). Depending on the implementation of the object tracking system 100, places, such as homes, base-office, base-warehouse, or other base locations may be considered areas where tracking objects are not needed and therefore various resources of the object tracking system 100 can be conserved. In a base area, items may be naturally stored in different places so that it is not necessary to check for missing items. The dispenser 101 may transmit its beacon rapidly, such as once per second or more in some implementations. The beacon signal may optionally include coordinates of the boundary of the geofence. In other implementations, the beacon signal may only include the coordinates of the dispenser, and the smart device may configure and store the appropriate range considered to be within the geofence. In an alternative implementation, the geofence can be established by signals from an activated wireless tape 102, adhered or placed at a home-base location.

In step 222, the smart device 103 may monitor for the dispenser 101 beacon. If the dispenser 101 beacon is not received, then the smart device 103 may flag its state as not being at the base (step 224). Otherwise, if the beacon is received by the smart device 103, the smart device 103 may read the coordinates of the geofence (or in some implementations generate the coordinates of the geofence). The smart device 103 may also identify its own coordinates using location services, such as Global Positioning System (GPS), Global Navigation Satellite System (GNSS), Wi-Fi positioning, or other location services. The smart device 103 may compare its location to the location of the geofence. If the smart device 103 is within the geofence, then the smart device 103 may flag its state as being at base (step 223). Otherwise, the smart device 103 may determine that it is outside the geofence and flag its state as being outside of base (step 224).

In step 225, when the smart device 103 is in an out-of-base state, the smart device 103 may monitor for beacons from one or more wireless tapes 102, which may have been attached to one or more items of interest by a user of the object tracking system 100 and the carrier of the smart device 103. In step 230, the wireless tapes 102 in the area may transmit their beacons. Those beacons may be received by the smart device 103. When the smart device 103 receives the beacon from the wireless tape, it may read the identifier and retrieve the associated records of that identifier from the local database 120. The smart device 103 may then store an indication in the local database 120 records that the item tracked by the wireless tape 102 is present (step 226). This assumption can be made because the wireless beacons sent by the wireless tape 102 have a short range of, for example, 8-10 feet. The smart device 103 may track the elapsed amount of time since a beacon was last received from each wireless tape 102 by querying its local database 120. When a threshold amount of time has been exceeded since a beacon was last received from a wireless tape 102, then the smart device 103 may mark the associated item in the local database 120 as not present (step 227). The smart device 103 then determines whether to alert (step 228) or not alert (229) the user of the smart device 103 for an item not being present/found. Alerts may be shown by displays on a screen, with sounds, with haptic feedback, or by any other alert mechanism, using the smart device 103.

The process of alerting or not alerting may be determined according to multiple conditions. In one implementation, one or more checklists of items may be selected and activated by a user of the smart device 103. The checklists may each include one or more items that should be present with the user. If an item on the checklist is not present at step 227, then an alert may be generated. In other implementations, an alert may be generated if the user initially had an item with him when he left the geofence at step 224 but, at some point, the smart device 103 detected that the item no longer is with him. This may indicate that a user took an item with him from a base location (such as home or work) and then lost it. Consequently, an alarm can be generated at step 228, so the user can look for the time.

In other implementations, the conditions may be received from a user about when to alert about the absence of certain items. For example, configurations may be received from a user that alerts for an item should only be generated on certain days of the week, at certain times of day, during certain weather conditions, or various other conditions. In other implementations, whether the absence of an item should be alerted may be determined by training a machine learning model. The machine learning model may be trained using data, such as an indication of when a beacon signal was no longer received (input) and an indication of whether the associated item was actually lost (desired output value). The machine learning model may be trained to trigger an alert when an item is likely to have been actually lost. The machine learning may analyze features related to a beacon signal, such as the associated item, time of day, location, and so on and use that to predict whether an alert should be generated. Machine learning models that may be used herein may include Bayesian classifiers, logistic classifiers, logistic regression, linear regression, neural networks, random forests, support vector machines, and any other machine learning model.

In some cases, the smart device 103 may not receive a beacon signal from one or more wireless tapes 102 even though they are within range of about 8-10 feet, and they have transmitted the beacon signal. This may be due to RF interference from other devices causing a missed signal. In cases where a user is about to leave a location, a missed beacon signal from a wireless tape 102 can mistakenly indicate an item is missing. In these scenarios, it is advantageous if the user can manually trigger the wireless tape 102 to send one or more additional beacons to indicate to the presence of the wireless tape 102 and its associated item to the object tracking system 100. A user may simply tap the wireless tape 102 to trigger an immediate wireless beacon. This may be achieved with a sensitive switch such that when pressure is applied to an external surface of the wireless tape 102, an electrical signal is sent to one or more of the wireless communication circuit 111, the processor 112 and the timer 113 to activate one or more of these components and send a wireless beacon. Alternatively, a piezo electric material may also be included in the wireless tape 102. The piezo electric material can be sensitive to haptic signals, for example from a touch or tap, and can emit a signal when activated. That signal from the piezo electric material may also be used to trigger a wake up of one or more additional components of the wireless tape 102 (e.g., processor 112) to send a wireless beacon to the smart device 103.

Wireless Tape 102

Various techniques and material, described herein, can be used to manufacture the wireless tape 102 in an ultrathin fashion. For example, the inclusion of the battery source in most ultrathin devices can be challenging. In one implementation, the wireless tape 102 can be manufactured as a laminated structure, where a battery source is integrated in the laminated structure to distribute the battery components between various layers to reduce the overall area consumed by the battery source and to maintain the flexibility of the wireless tape 102.

Figure 3:
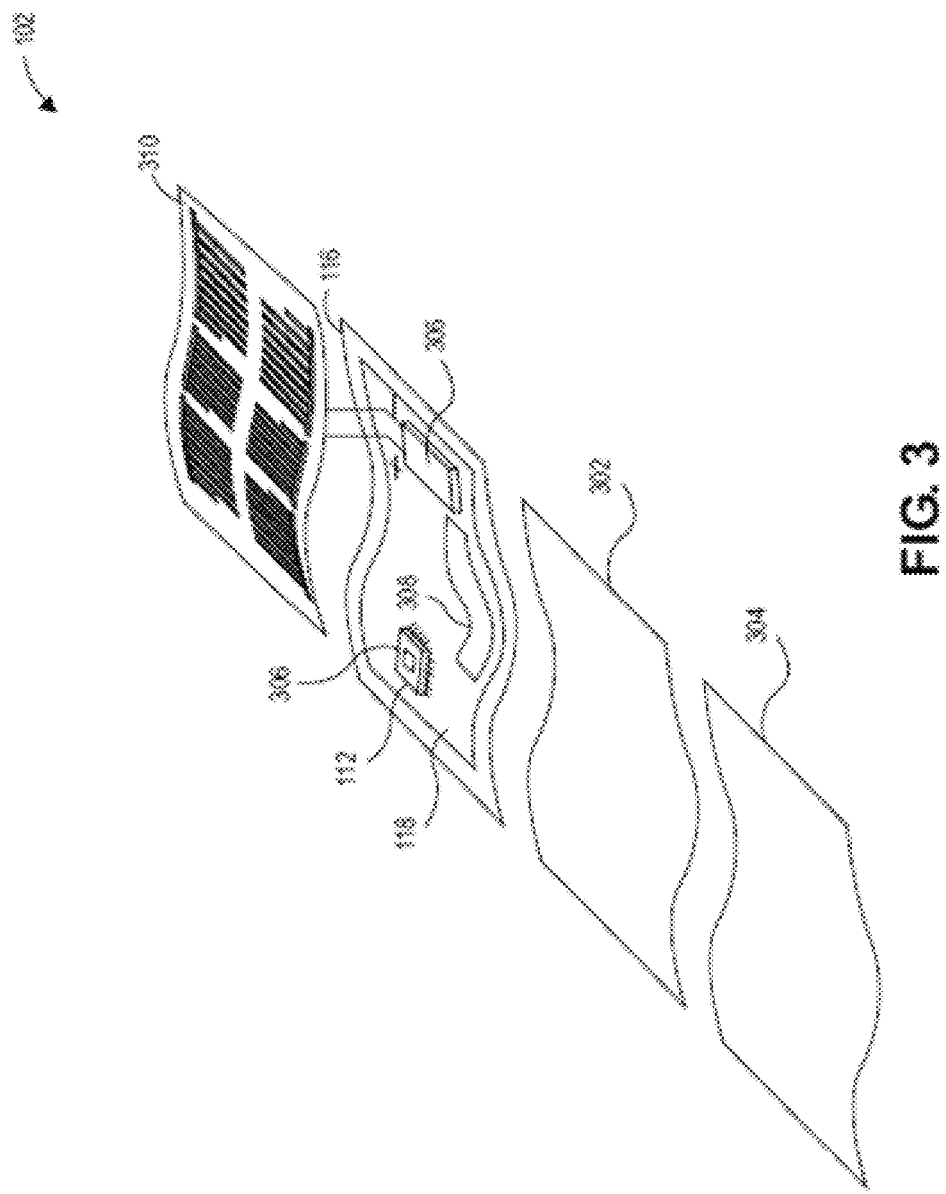
FIG. 3 illustrates some layers and arrangements of the layers in an example wireless tape according to an implementation, where a layered battery structure is used.

FIG. 3 illustrates some layers and arrangements of the layers in an example wireless tape 102 according to an implementation, where a layered battery structure is used. In the implementation shown, an anode layer 302 of the battery powering the wireless tape 102 is the bottom layer. In one implementation, the anode layer 302 may be a graphite coated anode in a reel-to-reel process. The substrate layer 116 and the components thereon are sandwiched between the anode layer 302 and a photovoltaic layer 310. The photovoltaic layer 310 can be formed from a lattice of an organic photovoltaic (OPV) material or other solar energy harvesting material. The interconnect layer 118 formed on the substrate 116 can function as a cathode of the battery powering the electronics 306 of the wireless tape 102. A battery pouch 308 containing electrochemical components of the battery can be formed on the interconnect 118. The substrate 116 can be an ultrathin and flexible material such as a polyester or Polyethylene terephthalate (PET). The interconnect layer 118 can be coated with a conductive metal, such aluminum. The battery pouch 308 can be manufactured by coating the interconnect 118 in the battery portion by an active lithium compound, such as lithium manganese dioxide. The wireless tape 102 can also include an adhesive layer 304 to allow the wireless tape 102 to be affixed to an item for tracking or other purposes.

The electronics 306 can include various components depending on the implementation of the wireless tape 102. For example, if the photovoltaic layer 310 is used, the electronics 306 can include circuitry to harvest and utilize light energy absorbed from that layer to power the electronics 306. If manual beacon trigger feature is included, the electronics 306 can include an associated switch and/or piezo electric sensors. The electronics 306 can include the components of the wireless tape 102 as described above. Examples include, the wireless communication circuit 111, the processor 112, the timer 113 and the memory 117. These components can be discrete, separate components or they can be part of an integrated circuit implementing their functionality in one or multiple chips. In some implementations, as will be described, the electronics 306 can include an analog to digital converter (ADC). Additional electrical components 306, depending on the implementation of the wireless tape 102 can include, a near field communication chip (NFC), sensors (e.g., sensors for detecting ambient light, motion, acceleration, temperature, etc.). While not shown, the interconnect layer 118 can be patterned in a manner to provide electrical connection and/or isolation between the electrical components 306 of the wireless tape 102. The layers shown are for example purposes only and persons of ordinary skill in the art can envision that the wireless tape 102 may be manufactured with more or fewer layers than those shown.

Example Dimensions and Components of Wireless Tape 102

Implementations of the wireless tape 102 may be constructed in various ways. One implementation of the wireless tape 102 is a paper-thin label that comprises ultrathin electronics printed or etched on laminated layers of a polyester film (e.g., PET), as described earlier. In some implementations, the thickness of the wireless tape 102, including the layers and the electronics therein, depending on the implementation, can range from approximately ½₀ of a millimeter, to half a millimeter. The electronics 306 may be etched or printed into the interconnect layer 118, or they may be attached or otherwise bonded to the interconnect layer 118, as separate chips or circuits or as various integrated or separate components, depending on the implementation. In some implementations, the wireless tape 102 is designed to transmit its beacon at intervals using a timer 113 as shown in FIG. 1B. This design may save energy by keeping the electronics 306 on the wireless tape 102, including the processor 112 and wireless communications chip 111, in a lower power or off state until they are awakened at intervals by the timer 113. When the timer 113 signals an active state, the signal is used to turn on or signal the processor 112 to activate and send a wireless beacon. In one implementation, the wireless beacon is formatted as a standard Bluetooth low energy (BLE) signal and/or an iBeacon. In an implementation, the timer 113 is a Texas Instruments TPL5110 and draws current of approximately 35 nano amperes (nA) or less. Texas Instruments of Dallas, Texas, can be reached at (972-995-2011). The timer 113 is configured to turn on or signal the processor 112 at intervals, such as every ten seconds. In some implementations, the timer 113 may be set to activate at a rate between every five to ten seconds, five to fifteen seconds, five to twenty seconds, two to twenty seconds, one to thirty seconds, or one to sixty seconds. In an implementation, the processor 112 is the Nordic Semiconductor, nRF52810 manufactured by Nordic Semiconductor ASA of Trondheim, Norway (+47 72 89 89 00). As will be described, some implementations of the wireless tape 102 may send wireless beacons based on sensor data, instead of or in addition to input signal from the timer 113. Consequently, in some implementations, the timer 113 can be optional.

As previously discussed, the RF communication processor and the RF processor can be implemented in single or multiple chips. For example, when a Bluetooth wireless communication circuit is used to implement the wireless tape 102, the processor 112 can include Bluetooth wireless communication circuitry, and timing circuits, as well as volatile and non-volatile memory to carry out the operations of the wireless tape 102. Alternatively, some components may be integrated, while others can remain as separate components. Consequently, a single chip may combine the functionality of an RF communication circuit and an RF processor. Thus, an RF processor chip can include an RF communication circuit.

To help achieve an ultrathin form factor for the wireless tape 102, one or more of the surface areas of the battery pouch 308, the anode layer 302 or the cathode layer (e.g., some or a portion of the interconnect layer 118) can be used as a wireless communication antenna, instead of a traditional dedicated antenna component (such as a printed antenna). For example, in some implementations, the surface area of the battery pouch 308 comprises a substantial area within the wireless tape 102 and can function additionally as a wireless antenna component to radiate wireless beacons. When a Nordic nRF52810 or similar processors 112 are used, the wireless balun at the analog output of the processor 112 can be connected to an outside metal foil of the battery pouch 308, or the anode layer 302 or to the interconnect layer 118 and/or a portion thereof, where these components can additionally function as an antenna.

The wireless tape 102 may be designed with an adhesive layer to attach the wireless tape 102 to a surface of an item of interest to track the item. In one implementation, As described, the wireless tapes 102, in some implementations, can be fabricated on a very flexible substrate 116 (e.g., a PET substrate), with a thin, flexible, lithium primary battery source printed or laminated directly to a flexible coated interconnect layer 118, therein. In one implementation, the battery may be printed onto the interconnect layer 118.

In one implementation, the wireless tape 102 may be designed to adhere to a range of surfaces and things. In an implementation, one or both sides of the wireless tape 102 are coated with an adhesive to allow sticking to other objects. Similar to a piece of common tape, wireless tapes 102 can be manufactured on a roll of substrate and perforated on their edges to delineate each individual wireless tape 102. The wireless tapes 102 can be manufactured with the ability to tape back on itself, forming a loop to securely attach the wireless tape 102 to items, such as cables. Persons of ordinary skill in the art can envision other mechanical form factors for the wireless tape 102 to facilitate adhering the wireless tapes 102 to items of various shapes, sizes and textures.

Methods of Pairing Wireless Tape 102 with Smart Device 103

In one implementation, the wireless communication circuit 111 can be activated and paired with the smart device 103 using near-field-communication (NFC). NFC can be used to wirelessly communicate data stored on ID cards, payment devices, information tags and other memory-embedded devices. In one respect, NFC provides a way for a communicating device to send short bits of information at close distances without the need for the communicating device to draw power from a battery for sending that information. Instead, an NFC-enabled communicating device relies upon the radio frequency (RF) energy field of a reader device to generate sufficient energy that can be harvested by a silicon-based NFC chip to read/write to a memory device, and then reflect the information stored in the memory back to the reader.

NFC can be employed to pair NFC-enabled Bluetooth devices such as internet of things (TOT) appliances, wearables or other devices with user accounts on mobile phones. The pairing process can also pair these devices with backend databases associated with the user account. This works by users touching or bringing their smart devices (e.g., a smart phone) in close proximity to an NFC-enabled Bluetooth device. A coil antenna on a circuit board inside the NFC-enabled Bluetooth device receives and converts the RF energy field of the user's smart device to an electrical signal, which can turn on an NFC chip inside the NFC-enabled Bluetooth device. Example NFC chips include NTAG213, NTAG214, NTAG215, manufactured by NXP Semiconductors N.V. of Eindhoven, Netherlands (https://www.nxp.com/). Using the same energy harvested through the coil, the NFC chip can return to the smart device of the user, an NFC unique identifier. This NFC unique identifier is linked via a backend software (e.g., a database) to the Bluetooth identifier of the NFC-enabled Bluetooth device (e.g., at the time of manufacturing that product). The user's smart device can use the Bluetooth identifier to pair with the NFC-enabled Bluetooth device and communicate with it via Bluetooth. The pairing information can also be used to associate the NFC-enabled Bluetooth device with the user's profile and account in a backend database.

The NFC method of pairing described above can be used to pair a wireless tape 102 with a user's smart device 103, thereby eliminating the need for continuous broadcast of wireless beacons for pairing. Compared to continuous broadcast methods for pairing, the NFC method of pairing a wireless tape 102 and a smart device 103 consumes no battery power and prolongs the life of the wireless tape 102. Additionally, the described NFC pairing technique, can prevent multiple users from simultaneously pairing with the same wireless tape 102 because only the user whose smart device 103 is held within close proximity of the NFC-enabled wireless tape 102 (e.g., within 2-3 centimeters range of the wireless tape 102) can receive the NFC unique identifier and pair with that wireless tape 102.

However, in some implementations, the inclusion of an NFC chip (such as NTAG213) can add to manufacturing cost of the wireless tape 102, and/or the chip area dedicated to circuitry for pairing. Consequently, it is advantageous to utilize NFC techniques of pairing a wireless tape 102 to a smart device 103, without the use of a dedicated NFC chip for pairing.

Figure 4:
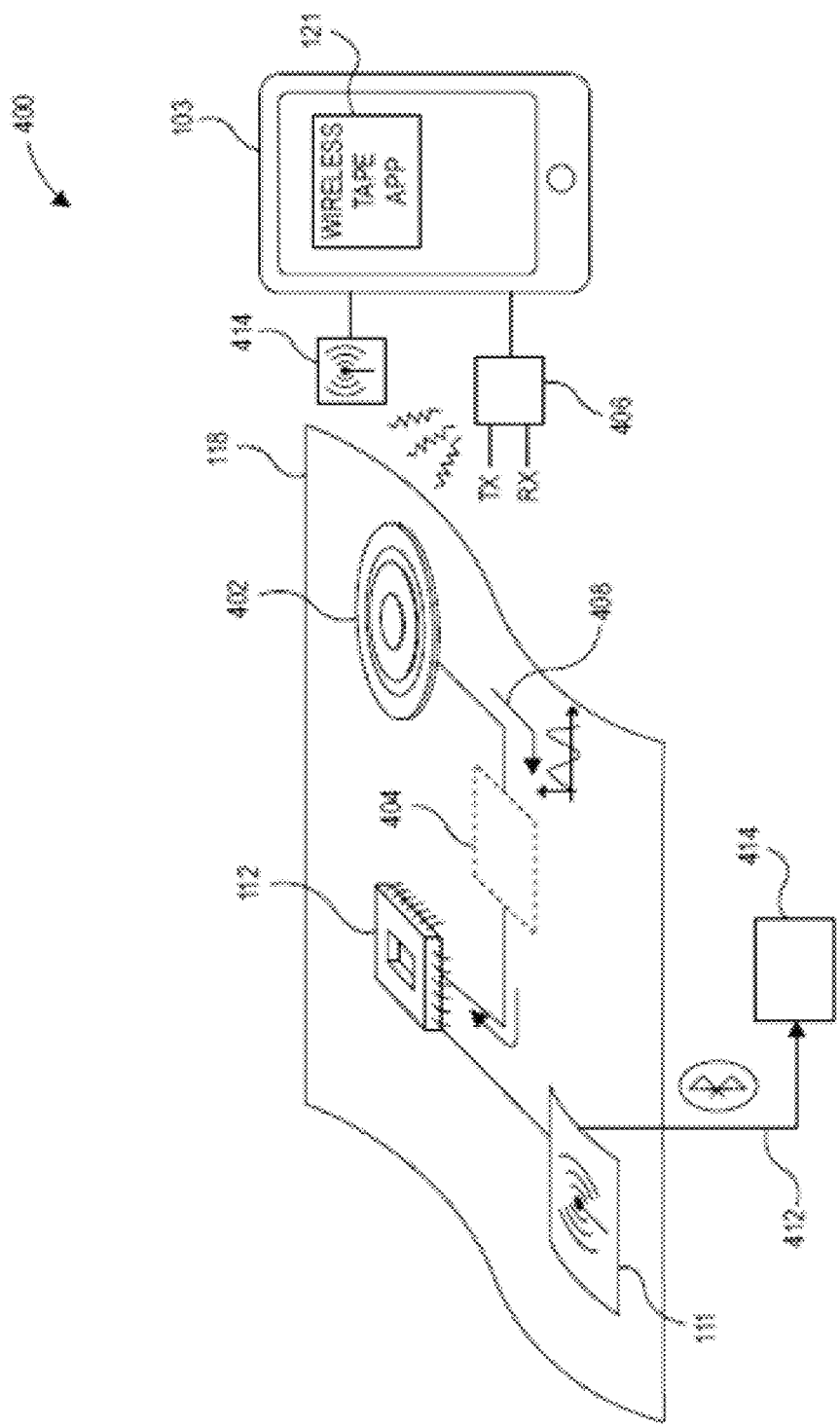
FIG. 4 illustrates a diagram of a wireless tape, which can be paired to a smart device without using a dedicated NFC pairing chip.

FIG. 4 illustrates a diagram 400 of a wireless tape 102, which can be paired to a smart device 103, without using a dedicated NFC pairing chip. As described earlier, the electronics of the wireless tape 102 can be manufactured on an interconnect layer 118, which is patterned to create electrical connections and isolation between various electrical components on the interconnect layer 118. The diagram 400 does not illustrate every component and layers of an NFC-enabled wireless tape 102. Only some components are shown to illustrate Bluetooth pairing using NFC, without a dedicated NFC chip. An NFC coil antenna 402 and an RF energy harvesting circuit 404 can be manufactured on the interconnect layer 118. A user's smart device 103 is equipped with an NFC transceiver 406 capable of generating and transmitting an RF energy field with wake-up frequency (WUF). The coil antenna 402 is tuned to resonate at the wake-up frequency, WUF sent by the transceiver 406. In some implementations, the NFC energy harvesting circuit 404 can include components, such as one or more capacitors, and rectifiers to convert an alternating current (AC) signal generated in the coil antenna 402 to a direct current (DC) signal by which the processor 112 can be awakened. In another implementation, the NFC energy harvesting circuit 404 can include components that capture a wake-up voltage 408 from the coil antenna 402 and transmit the wake-up voltage 408 to the processor 112 to wake up the processor 112. In another implementation, the NFC energy harvesting circuit 404 and some or all components therein can be skipped. In this scenario, the wake-up AC voltage generated in the coil antenna 402 can be used to directly wake up the processor 112, without converting AC voltages to DC voltages. Advantages of eliminating some or all of the components of the NFC energy harvesting circuit 404, include, lowering manufacturing cost and complexity of the NFC-enabled wireless tape 102. In other implementations, some or all of the components of the NFC energy harvesting circuit 404 can be integrated in the processor 112, when the processor 112 is implemented as a system on chip (SOC) solution.

Figure 5:
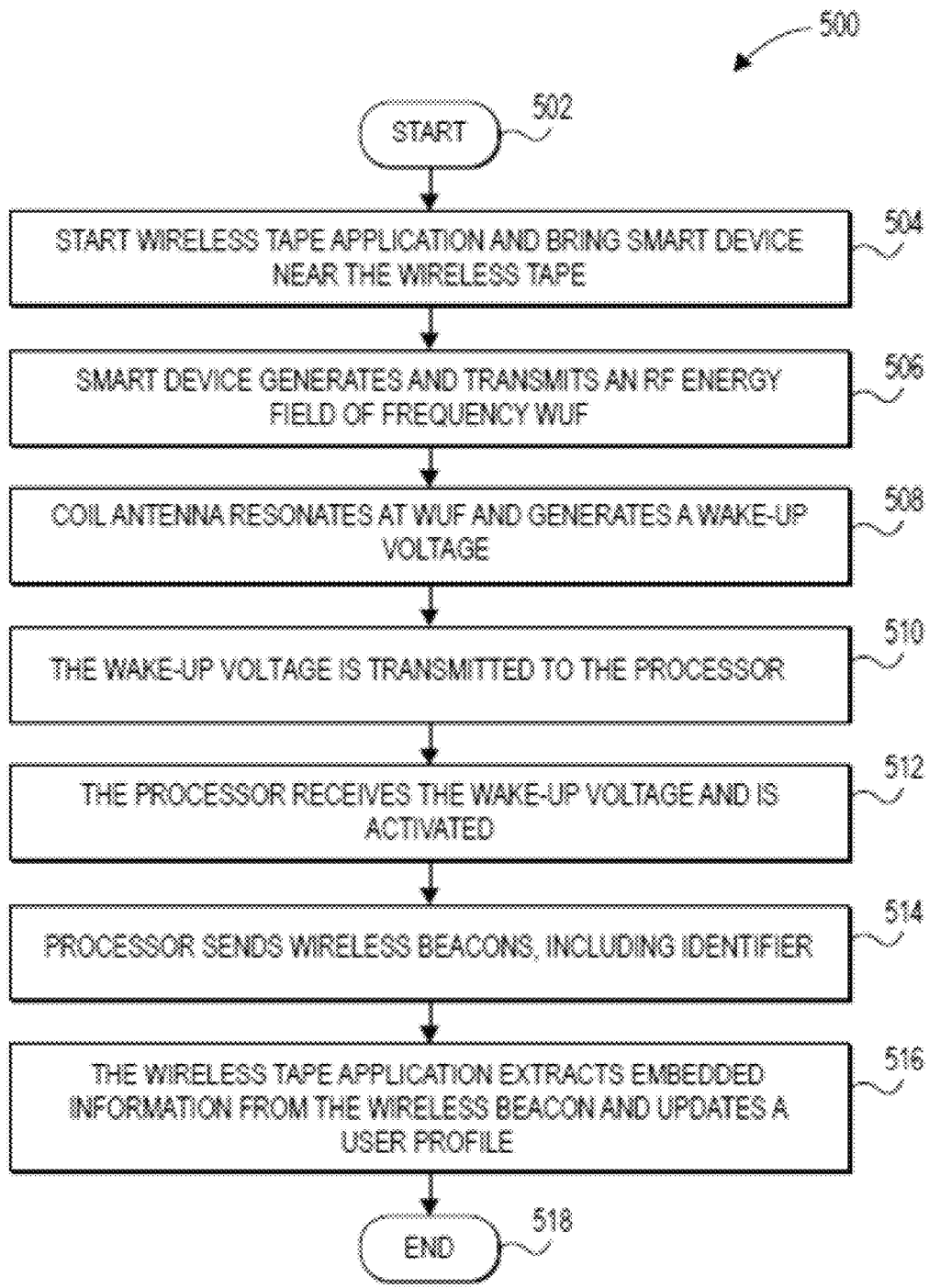
FIG. 5 illustrates a method of Bluetooth pairing of an NFC-enabled wireless tape with a smart device.

FIG. 5 illustrates a method 500 of Bluetooth pairing of an NFC-enabled wireless tape 102 with a smart device 103. The processor 112 can be a Bluetooth microprocessor, such as Nordic Semiconductor, nRF52810, as described above, and the wireless communication circuit 111 can be a Bluetooth communication circuit. While the processor 112 and the wireless communication circuit 111 are shown as separate components, in some implementations, they can be part of an integrated Bluetooth chip. The processor 112 includes a general-purpose input/output (GPIO) port capable of receiving GPIO signals. The smart device 103 can be configured to execute program instructions to run the wireless tape application 121. The wireless tape application 121 can configure the transceiver 406 to resonate at the wake-up frequency, WUF. The method 500 starts at the step 502. At step 504, the user of the smart device 103 executes the wireless tape application 121 and brings the smart device 103 in close proximity (e.g., approximately within a 5-centimeter range) of the coil antenna 402 of the wireless tape 102. At step 506, the transceiver 406 generates and transmits an RF energy field at the wake-up frequency, WUF. The coil antenna 402 is tuned to resonate at the wake-up frequency, WUF. At step 508, the coil antenna 402 resonates at the wake-up frequency, WUF, and a wake-up voltage 408 is generated and transmitted to a GPIO port of the processor 112.

In some implementations, the NFC energy harvesting circuit 404 can include components that convert the wake-up AC voltage 408 to a DC voltage. However, both a DC or AC voltage can be used at a GPIO port of the processor 112 to wake up the processor 112. For example, in some implementations, voltages (DC or AC) above 0.7 Volts (V) at the GPIO port, can wake up the processor 112. In some instances, a conversion of the wake-up AC voltage 408 to a DC voltage may be desirable to protect the processor 112 from potentially receiving an unsafely high voltage. Nevertheless, the AC to DC conversion in some implementations can be safely skipped because the range of voltages the NFC-enabled wireless tape 102 and the coil antenna 402 encounter, most likely, do not exceed the levels that may be unsafe for the processor 112. As a result, the wake-up AC voltage 408 generated in the coil antenna 402 can be applied to the GPIO port of the processor 112, without conversion. In this scenario, the NFC-enabled wireless tape 102 can be manufactured, without the components, cost and complexity of converting NFC voltages.

In implementations where a threshold voltage to wake up the processor 112 is higher than the range of voltages the coil antenna 402 can generate, a comparator circuit as an external component or as an integrated component in the processor 112, as part of a system on chip (SOC) solution, can receive the wake-up signal and wake up one or more additional circuits in the processor 112. For example, in some implementations the processor 112 can wake up when it receives a voltage above a wake-up threshold voltage of approximately 0.7V, where the antenna coil 402 can generate voltages of approximately 0.3-0.4V or lower. A comparator circuit can detect low voltages generated from the antenna coil 402 (e.g., as low as approximately 1.8V in some implementations) and wake up the rest of the circuitry in the processor 112.

At step 512, the processor 112 receives the wake-up voltage 408 at its GPIO port and is awakened from an inactive state (e.g., a deep shutdown state). At step 514, the processor 112 uses the wireless communication circuit 111 to send a sequence of Bluetooth beacons 412 (e.g., via low powered BLE signals), which can be received by the wireless communication facilities of the smart device 103. The wireless facilities of the smart device 103 can include Bluetooth communication circuits 414. The Bluetooth beacons 412 can include a Bluetooth identifier, and/or other information which may be included in the pairing process. For example, the Bluetooth beacons 412 can include a unique identifier of the wireless tape 102. At step 516, the wireless tape application 121 can receive the information embedded in the Bluetooth beacon 412 and use them to associate the wireless tape 102 with the user profile of the wireless tape application 121 and the smart device 103. The method 500 ends at the step 518.

In some implementations, the Bluetooth beacons 412 can be customized to further identify the wireless tape 102 and/or other information to be included in the pairing process. For example, the Bluetooth beacons 412 can comprise an initial startup sequence having a pre-defined sequence and/or having a predefined power-level, also identified and recorded in the wireless tape application 121. Such information can be uploaded via the wireless tape application 121 upon purchase of a roll of wireless application tapes 102, the dispenser 101 and stored in the local database 120 and/or remote database 122. In some implementations, a camera of the smart device 103 can be used to scan a barcode from a dispenser 101 or from a roll of wireless tapes 102, where the barcode can include pairing information associated with the wireless tapes 102.

While the method 500 is described in the context of pairing Bluetooth devices, persons of ordinary skill in the art can appreciate that the described systems and methods can be modified to apply to other communication protocols, such as radio frequency identification (RFID) and others. Additionally, while the described systems and methods of NFC pairing, without a dedicated NFC chip, is described in the context of pairing of wireless tapes 102, the persons of ordinary skill in the art can appreciate that the described technology can be used in other applications, where pairing of wireless devices are desired. For example, in many applications, wireless device pairings are performed infrequently or only once in the lifetime of the product. At the same time, the cost of an NFC chip used infrequently or only once for an initial pairing, may be prohibitive in several applications. The described technology can be used in these and other scenarios, where pairing of wireless devices is desired.

Method for Enhancing Background Performance of Bluetooth Beacon Proximity Detection The Bluetooth communication protocol allows and defines an advertising wireless signal by which Bluetooth-enabled devices can broadcast their presence and availability for connection and communication. Other Bluetooth-enabled devices, such as mobile phones, smart phones and other Bluetooth devices can listen for these advertising signals to determine the presence of Bluetooth-enabled products and can send follow-up messages to those products to inquire about services they can acquire from them. The advertising signals can be connectable or non-connectable. In either case, both types of advertising signals can be used to determine presence and/or proximity. Operating systems of smart devices have special provisions to listen for and detect Bluetooth advertising signals. For example, Apple operating systems detect the advertising signals generated using Apple's iBeacon and Google operating systems detect the advertising signals generated using Google's Eddystone. Both companies have built provisions in their operating systems to detect and to be responsive to these advertising signals in a standard BLE beacon formatted packet. These advertising signals have also been used across many industries for marketing purposes because the advertising signals can indicate the presence and in some cases position data of a customer's mobile phone, based on the strength of the advertising signal received.

At the same time, a mobile phone or other smart devices which monitor and listen for advertising signals from other Bluetooth devices can waste power from their battery sources, when no other advertising Bluetooth devices may be present. In many cases, there may not be a nearby advertising device. In the case of mobile phones, manufacturers and operating system designers are concerned about such scenarios that lead to inefficient use of battery power in their devices. As a result, most mobile phone manufacturers and operating system designers build provisions in their devices and systems to limit the amount of time their devices are in a state of listening for advertising signals from other devices. At the same time, in order to further save battery power, most battery-operated smart devices, such as smart mobile phones, and their operating systems optimize their background processes to ignore, remove or otherwise limit the resources allocated to redundant and/or redundant background processes or background processes that the device may determine to be redundant or less critical, such as listening for advertising signals from other Bluetooth devices.

Mobile phones ignoring broadcasting signals from other devices or limiting background processes associated with them can present a challenge for non-marketing applications, such as asset tracking using wireless labels. The battery resources of wireless labels can be limited and it is advantageous that a target mobile phone or smart device receiving these broadcast messages, receives them and affords them a higher priority in processing. Otherwise, the wireless label may need to send multiple broadcast signals and waste its limited battery power in order to connect/communicate with a mobile phone or smart device.

Figure 6:
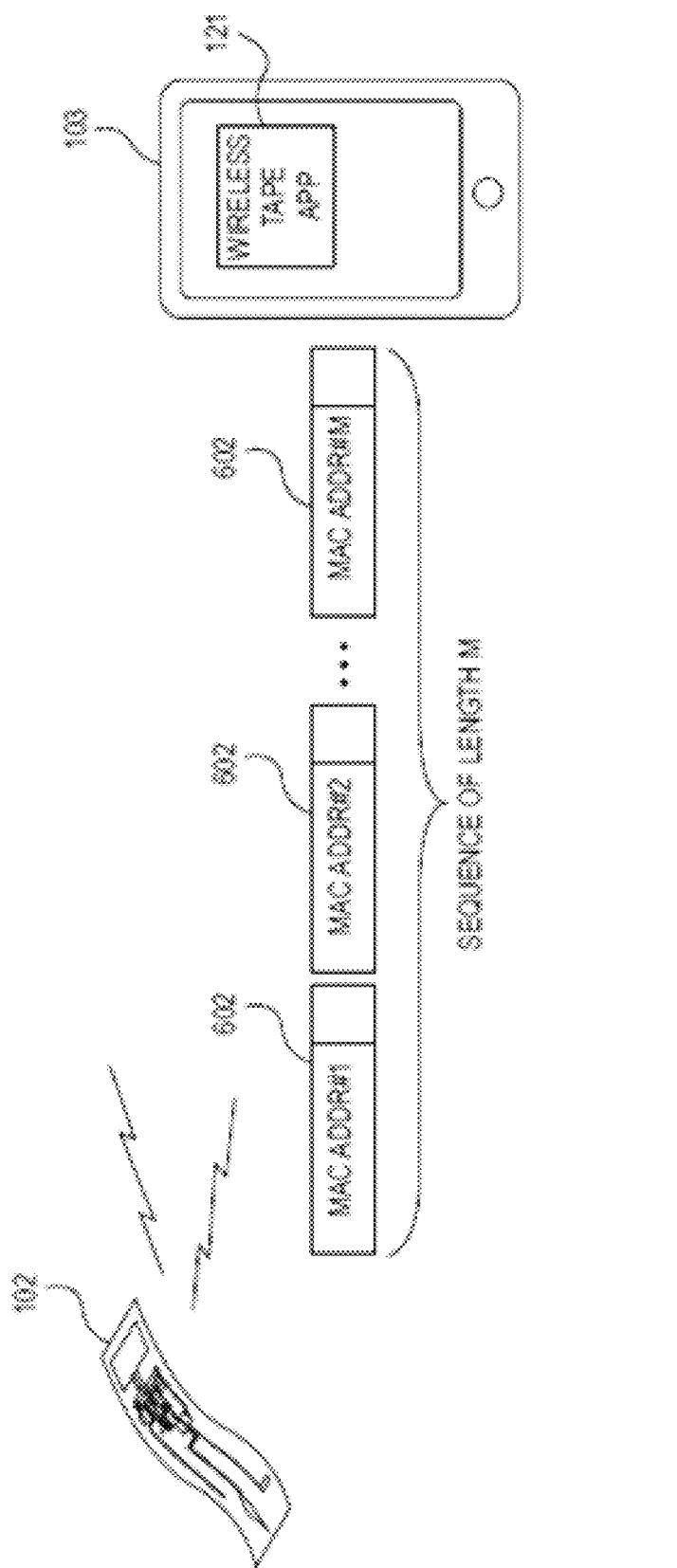
FIG. 6 illustrates a diagram of a communication protocol between a wireless tape and a smart device, which can enhance the background processes of the smart device in relation to the processing of the signals received from the wireless tape.

FIG. 6 illustrates a diagram of a communication protocol between a wireless tape 102 and a smart device 103, which can enhance the background processes of the smart device 103 in relation to the processing of the signals received from the wireless tape 102. In one implementation, the wireless tape 102 can modify its broadcasting signals 602 to simulate multiple devices sending them. The operating systems of the smart device 103 and similar devices are more likely to listen and allocate more background processes to received broadcasting signals 602 if they appear to be from new devices that they have not listened to before and/or have not processed before. In other words, in the described implementation, the broadcasting signals 602 are not redundant. The redundancy in the broadcasting signals 602 can be removed by a variety of means.

In one implementation, the media access controller (MAC) address and/or the universally unique identifier (UUID) of the wireless communication circuit 111 can be programmatically modified based on a predefined modification algorithm (PMA). If broadcasting signals 602 have varying MAC address and/or varying UUID, the operating system of the smart device 103 perceives the broadcasting signals 602 to have come from different products, which it may have not previously encountered before. Consequently, the operating system of the smart device 103 allocates more background processes and resources to listening, collecting and otherwise processing of the broadcasting signals 602.

The wireless tape application 121, locally and/or in combination with the server 104 can receive the broadcasting signals 602 and resolve that they are from wireless tape 102, based on the predefined modification algorithm (PMA). For example, in one implementation, the PMA can be to increment the UUID of every 10 broadcasting signals 602 (where each broadcasting signal 602 comprises a packet) monotonically by a predefined value (e.g., by one). The operating system of the smart device 103 treats the broadcasting signals 602 with higher priority since they have different UUIDs and appear to be from different devices. However, the wireless tape application 121, having the PMA can resolve that every 10 broadcasting signals 602 are from the wireless tape 102. Other PMAs can also be used. For example, the MAC address and/or the UUID amongst a sequence of broadcasting signals 602 can be modified based on an algebraic expression, where the wireless tape application can use the algebraic expression to derive the original MAC address and/or UUID. In another implementation, the PMA can be an algorithm that randomizes the MAC address and/or UUID in a sequence of broadcasting signals 602. Yet in other implementations, hopping and/or omitting MAC addresses and/or UUIDs from a predefined pool of MAC addresses and/or UUIDs can be used.

Figure 7:
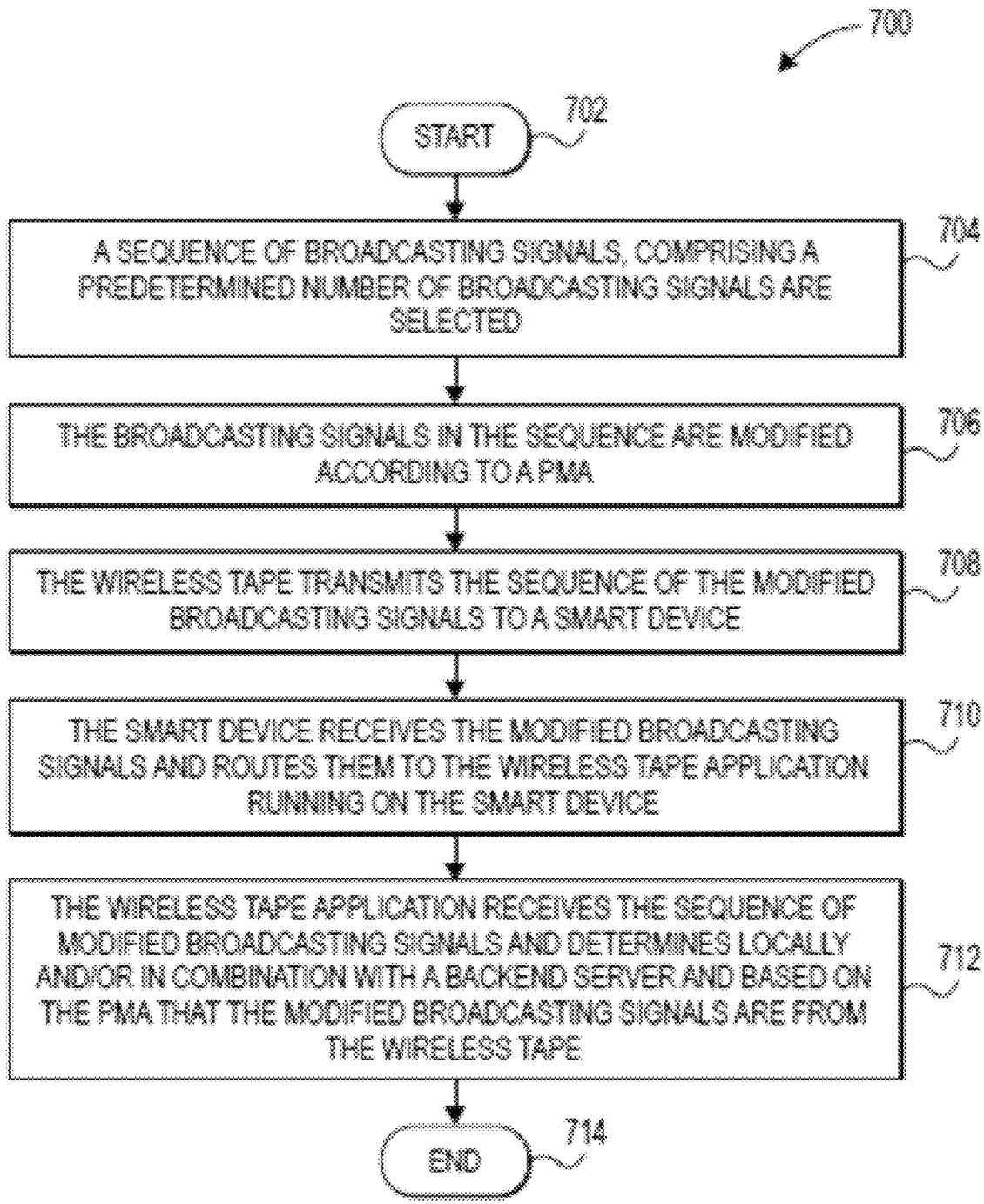
FIG. 7 illustrates a method of enhancing the background processes of a smart device in relation to receiving broadcasting signals from the wireless tape.

FIG. 7 illustrates a method 700 of enhancing the background processes of a smart device 103 in relation to receiving broadcasting signals 602 from the wireless tape 102. The method 700 starts at step 702. At step 704, a sequence of broadcasting signals 602, comprising a predetermined number of broadcasting signals 602 are selected. In one implementation, a broadcasting signal 602 is a BLE beacon formatted packet. At step 706, the broadcasting signals 602 in the sequence are modified according to a PMA. In some implementations, the PMA modifies the MAC address and/or the UUID embedded in one or more broadcasting signals 602. At step 708, the wireless tape 102 transmits the sequence of the modified broadcasting signals 602 to a smart device 103. At step 710, the smart device 103 can receive the modified broadcasting signals 602 and route them to the wireless tape application 121. The smart device 103 is more likely to receive some or all of the transmitted sequence of modified broadcasting signals 602 because they appear to be from different sources. At step 712, the wireless tape application 121 can receive the sequence of modified broadcasting signals 602 and determine locally and/or in combination with the server 104, and based on the PMA, that the modified broadcasting signals 602 are from the wireless tape 102. For example, in some implementations, the wireless tape application 121 and/or the server 104 can apply a reconstructing algorithm based on the PMA to reconstruct the original MAC addresses and/or UUIDs of the received modified broadcasting signals 602. The method 700 ends at step 714.

The described method of increasing background performance of smart devices 103 in relation to receiving and processing Bluetooth broadcasting signals 602 from the wireless tapes 102 can provide more resolution of data received at the smart device 103 because the receive path on the smart device 103 remains open longer and greater number of broadcasting signals 602 are received at the smart device 103. In addition to saving the battery power resources of the wireless tape 102, the greater resolution of the received data can have advantages, such as greater ability to use the broadcasting signals 602 for positioning of a tracked item with greater accuracy.

Method of Achieving Ultra-Low Power Using Changing Ambient Light Levels to Trigger Power Saving States in a Microprocessor-Based Device For many wireless devices (e.g., IOT devices) conserving battery power can be paramount. To maintain an ultrathin profile, many devices use a primary source. When the batter is exhausted, the battery or the device have to be replaced.

In many applications, it is often the device that has to be replaced, as changing the used batteries is not a practical option. As a result, many modern wireless devices need to conserve battery to achieve longer product life span. Nonetheless, many wireless devices broadcast their beacon on periodic basis, whether or not a listening device can capture their beacon. This scenario presents a challenge for applications where the broadcasting device has limited battery resources. For example, it is advantageous for an ultrathin profile wireless tape 102, used for tracking items, to broadcast its beacons when a smart device 103 is in the vicinity and capable of receiving the beacons and communicating with the wireless tape 102. It is also advantageous for the wireless tape 102 to limit or stop sending broadcasting beacons, when no smart device 103 is in the vicinity to receive the beacons. Additionally, it is desirable to increase the frequency at which the wireless tape 102 broadcasts its beacons if a smart device 103 is in the vicinity and able to receive and process those beacons. Conversely, it is advantageous to reduce the frequency of (or stop) sending the beacons if no smart device 103 is in the vicinity to receive the beacons.

Sensors can be used to modulate the broadcasting of beacons and/or their sending frequency in order to save battery resources. For example, vibration or motion sensors can be used in wireless devices (such as the wireless tape 102) to trigger and/or to modulate the sending frequency of broadcasting beacons emitted from the wireless device. If sensors detect motion and/or vibration, the wireless device can increase the frequency of sending broadcasting beacons. However, in some applications, the sensors consume more battery resources than they save. For example, in some applications, motion sensing with passive infrared (PIR) or similar motion sensors and motion sensing with an accelerometer to save battery resources can task the battery resources more than they save the battery resources. Yet in other applications, the cost of the additional sensors can be prohibitive in relation to the overall target cost of the product, thus making the use of these sensors impractical. For other wireless devices, the form factor and sizes of these sensors can be incompatible with their form factor or design.

In the case of wireless devices that operate by NFC, solar or other energy harvesting methods, the battery resources can be limited. Thus, it is advantageous to reduce or minimize broadcasting beacons, when no listening smart device 103 is in the vicinity.

In one implementation, fluctuations of light levels in the environment of a wireless device can be used to modulate the frequency of broadcasting beacons. In this scenario, fluctuations in light levels in the environment can indicate the presence of a listening smart device 103. For example, when a wireless device, such as the wireless tape 102 is used for asset tracking, the wireless tape 102 may be attached to an item, which is placed in a delivery van, a work truck, a supply room or other physical locations, where that item and the attached wireless tape 102 are stored. When a person carrying the smart device 103, who has an interest in the tracked item, enters the physical location where the item and the attached wireless tape 102 are located, the environment likely can experience fluctuations in light level. For example, an automatic motion sensor in the environment can turn the lights on, when the person enters the environment. Or when the person opens the door to a storage area (such as the cargo compartment of a van or truck), the storage area, where the tracked item and wireless tape 102 are located can be exposed to outside light and experience fluctuations in light levels.

Figure 8:
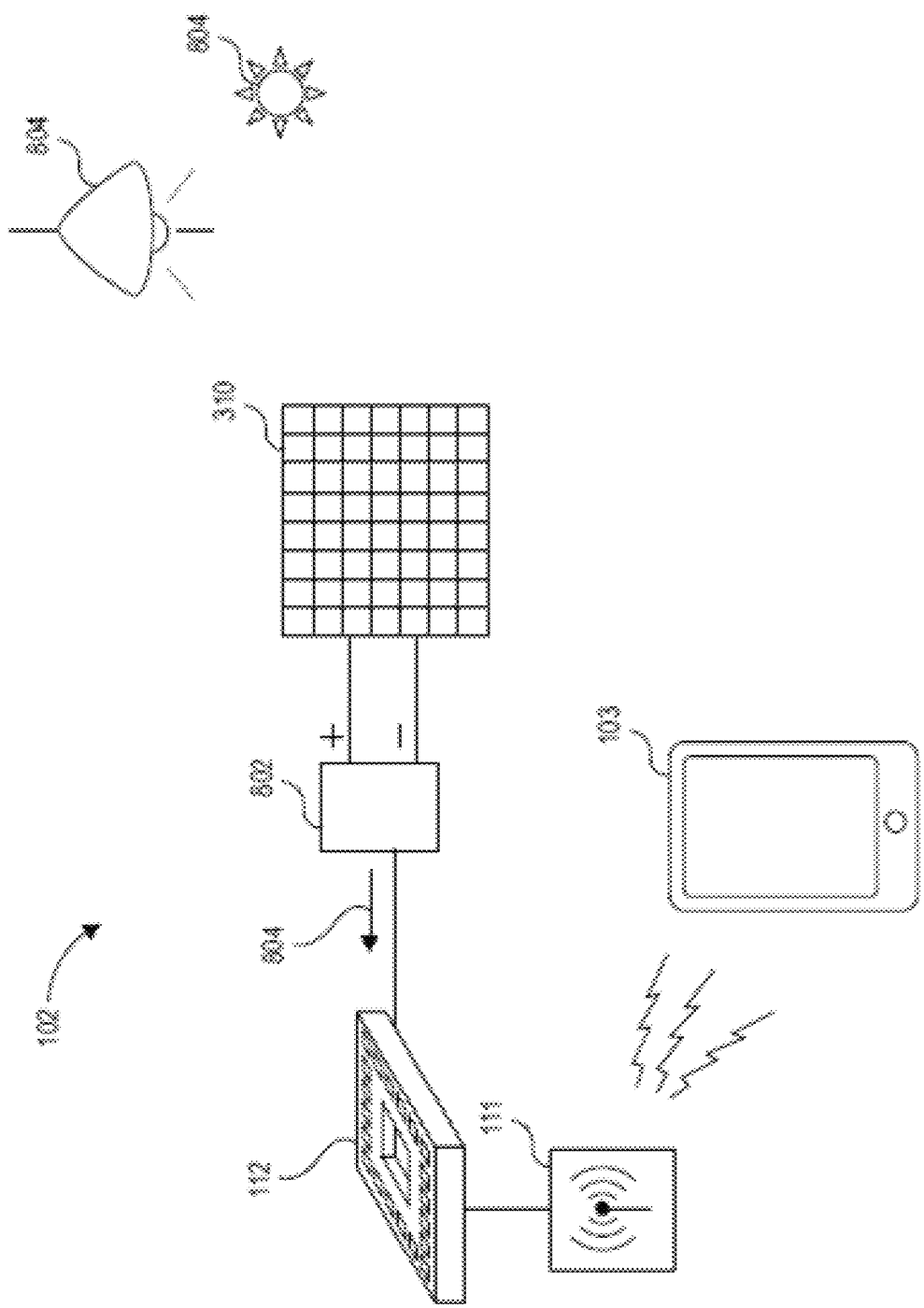
FIG. 8 illustrates an implementation of the wireless tape, where fluctuations in light levels can be used to modulate the frequency of broadcasting beacons.

FIG. 8 illustrates an implementation of the wireless tape 102, where fluctuations in light levels can be used to modulate the frequency of broadcasting beacons. The wireless tape 102 in this scenario includes a photovoltaic layer 310 (as described in relation to FIG. 3) and an energy harvesting circuit 802. Fluctuations in light levels can occur due to the photovoltaic layer 310's exposure to various light sources 804. The photovoltaic layer 310 and the energy harvesting circuit 802 convert light to an electrical signal 804 (e.g., a voltage or current), which can be received by the processor 112. The processor 112 can modulate the frequency of beacons sent from the wireless communication circuit 111, based on the value of the electrical signal 804. For example, the processor 112 can increase the frequency of broadcasting beacons, based on a rate of increase in the voltage received in the electrical signal 804. Accordingly, when a person carrying a smart device 103 enters the environment of the wireless tape 102 and exposes the photovoltaic layer 310 to fluctuations of light levels, the voltage generated by the energy harvesting circuit 802 can increase at a rapid rate, R1. The processor 112 can correspondingly increase the rate of broadcasting beacons from the wireless communication circuit 111 at the rate R1 or to an increased rate based on R1. In this manner, the increased broadcasting beacons have a better chance of detection by the smart device 103.

Conversely, if light fluctuations in the environment of the photovoltaic layer 310 is minimal, the voltage/current of the electrical signal 804 does not change or changes at a reduced rate, R2. The processor 112 can adjust the frequency of broadcasting beacons from the wireless communication circuit 111 to be at the reduced rate, R2 or another reduced rate based on R2. If R2 is zero, the frequency of broadcasting the beacons can be also zero or a reduced amount (e.g., every thirty seconds) in order to conserve the battery energy. In some implementations, the electrical signal 804 can be used to wake up the processor 112 and begin broadcasting beacons.

Figure 9:
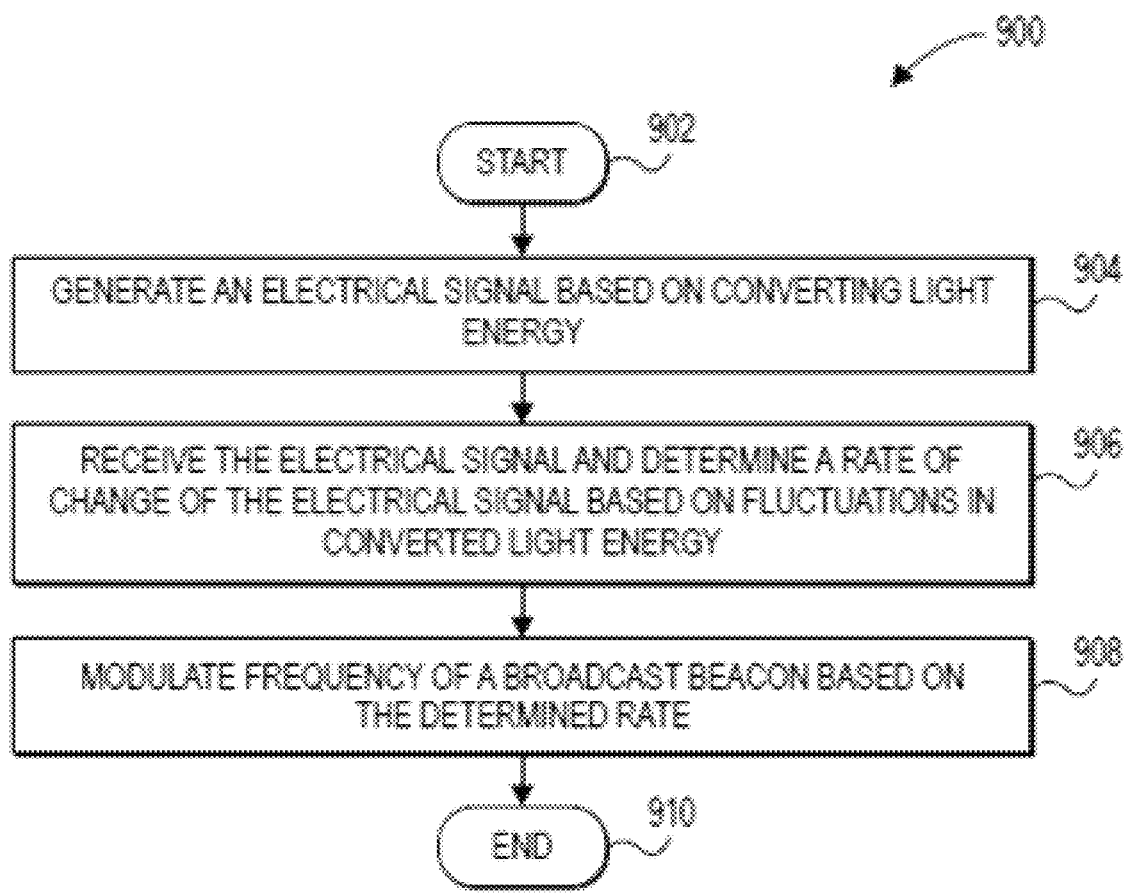
FIG. 9 illustrates a method of using fluctuations in light level to modulate the frequency of a broadcasting beacon.

FIG. 9 illustrates a method 900 of using fluctuations in light level to modulate the frequency of a broadcasting beacon. The method 900 starts at step 902. At step 904, the photovoltaic layer 310 and the energy harvesting circuit 802 generate an electrical signal by converting light energy from various light sources 804. At step 906, the processor 112 receives the electrical signal 804 and determines a rate of change of the electrical signal 804, based on fluctuations in converted light energy. At step 908, the processor 112 modulates the frequency of the broadcasting beacons sent from the wireless communication circuit 111, based on the determined rate. The method 900 ends at step 910.

Methods of Modulating the Frequency of Broadcasting Beacons from the Wireless Tape 102

Since the ultrathin form factor of wireless tape 102 can limit the battery size and capacity, ultra-low-power methods may be employed to optimize how beacons are sent from the wireless tape 102. Continuously sending wireless beacons even at a very low frequency can consume a considerable amount of power, unnecessarily, if no smart device 103 or receiving/listening device is present within range to listen for the wireless beacons. Therefore, it is advantageous to not send wireless beacons when no person carrying the smart device 103 is in the vicinity. An approach is employed to achieve this by taking advantage of the electrostatic effects on the wireless tape 102, when the environment around the wireless tape 102 changes. For instance, those changes might include, touching, moving, obscuring an item with the attached wireless tape 102, or even walking-by or touching another item nearby can all have an effect on the voltage potential present over various surface areas of the wireless tape 102. In one respect, the wireless tape 102 can function as a layered capacitor, whose charge level can be detected and used to modulate the frequency of wireless beacons it sends.

Changes in the voltage present on one or more surfaces of the wireless tape 102 can be measured by an analog-to-digital converter (ADC) periodically, or one or more conductive surfaces of the wireless tape 102 may be connected as inputs to a comparator circuit to trigger a wake up. Referring now to FIG. 3, electronics 306 can include a processor 112, which can in turn include an ADC and/or a comparator circuit. The ADC can periodically sample voltages/currents from at least one of the electrically conductive surfaces of the wireless tape 102. Example surfaces, which can be used include the interconnect layer 118 and/or the anode layer 302. A direct high-impedance connection can be made from an input of the ADC to the conductive surface in order to save manufacturing costs. The rate of change of voltages/currents received at the input of the ADC can be monitored among a plurality of sampled input data. If the rate changes more than a predetermined threshold between the samples, it can be inferred that something in the environment of the wireless tape 102 has changed, with a likelihood that those changes were caused by human motion, indicating the presence of a person. Since people carry smart devices 103 with them, the wireless tape 102 can correspondingly increase the frequency of broadcasting wireless beacons when changes that are likely due to human presence are detected as described above. In this manner, there is a higher likelihood that the increased broadcasting beacons can be received by a smart device 103.

The method of measuring the electrostatic potential obtained from a single conductive plane within the wireless tape 102, in some cases, can be prone to interference and error from noise. In particular, the 50-60 Hz noise due to power line noise can be present in many environments, causing errors in detecting a voltage/current change due to an environmental change indicative of human presence. At the same time, to conserve the battery resources of the wireless tape 102, it may not be desirable to sample the surface voltage/current at an increased rate in the processor 112 and remove the noise digitally. Furthermore, cost constraints can make filtering with added electrical components also a less desirable option. Therefore, one implementation uses a differential ADC sampling method by receiving two inputs from two adjacent conductive planes of the wireless tape 102 to detect and reject the common mode noise. Voltage/current changes can be measured differentially. The ADC can measure the voltages/currents on the two conductive surfaces (e.g., the interconnect layer 118 and the anode layer 302 or other conductive parallel plates in wireless tape 102) and the readings can be passed as signals to the processor 112. When the processor 112 determines that the difference between the readings exceeds a predetermined threshold, then this can indicate a change in the environment and the processor can modulate the frequency of broadcasting beacons accordingly.

Another method of reducing noise and increasing reliability is to sample multiple, electrically isolated planes of the wireless tape 102, either within a sample plane or within parallel planes (e.g., between parallel planes that form a capacitor within the wireless tape 102) and average the readings from the multiple planes. Since in some implementations, the wireless tape 102 can resemble a capacitor, after a change in the environment of the wireless tape 102 causes a voltage differential to occur in the parallel plates of the capacitor, the time constant of the capacitor formed by parallel planes within the wireless tape 102 discharges to a stable equilibrium. The time constant parameter can be measured or derived from the voltage readings and a rate of frequency of broadcast of beacons can be correspondingly adjusted.

Additional Methods of Activating the Wireless Tape 102

Figure 10:
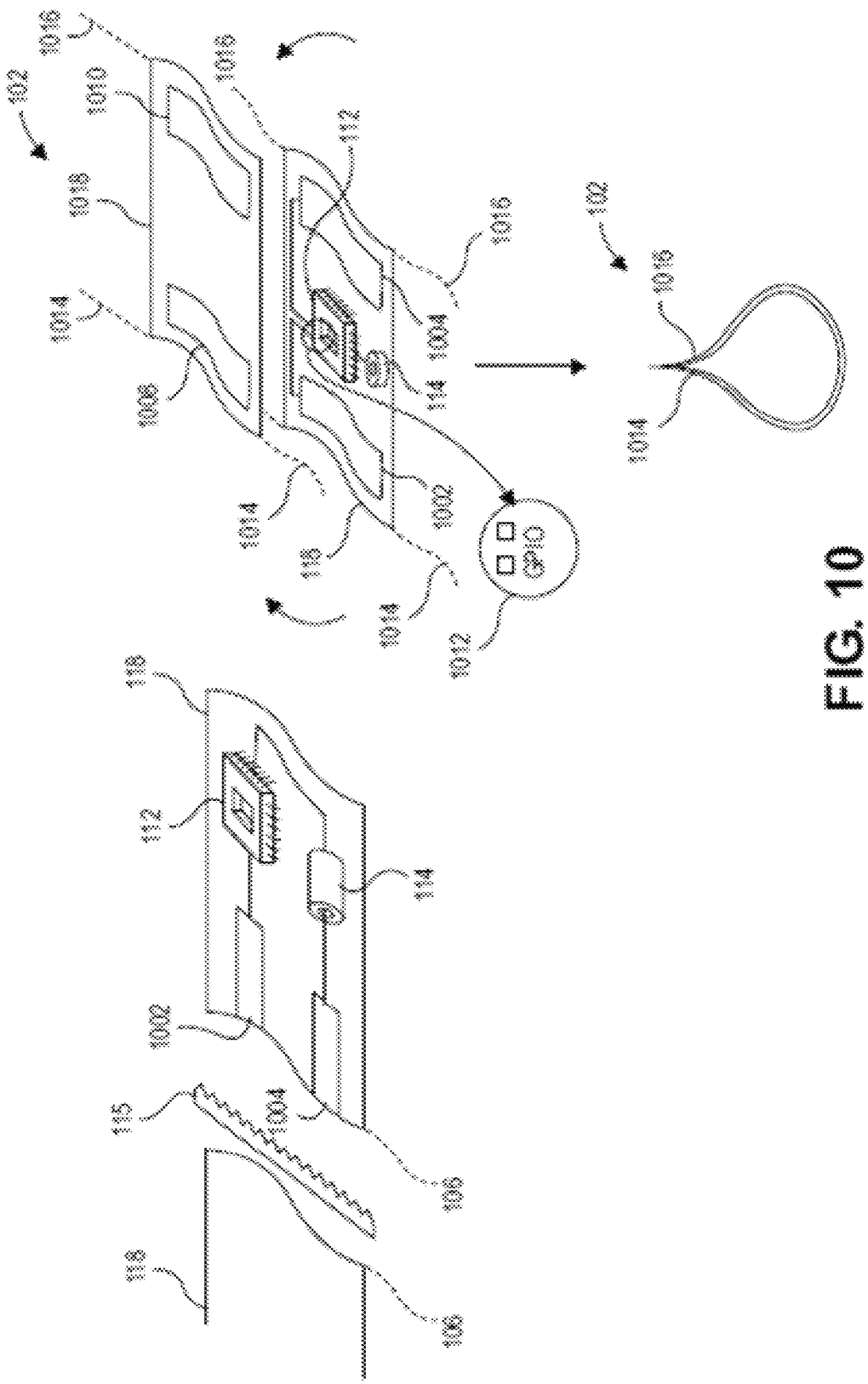
FIG. 10 illustrates diagrams of various implementations to maintain the wireless tape in a low-power state when in storage or before deployment by a user of the object tracking system.

It is advantageous to conserve the battery resources of the wireless tape 102 by maintaining the electronics 306 in a low-power of off-state, until the wireless tape 102 is to be used. FIG. 10 illustrates diagrams of various implementations to maintain the wireless tape 102 in a low-power state when in storage or before deployment by a user of the object tracking system 100. In one implementation, two conductive planes 1002 and 1004 can be patterned on the interconnect layer 118 or in one or more layers of the wireless tape 102 in a manner that the conductive planes 1002 and 1004 form a part of an edge 1006 of the wireless tape 102. The edge 1006 can be an edge between two discrete wireless tapes 102 (e.g., from a roll of wireless tapes 102). A metal cutting means 115 can shear the roll of wireless tapes 102 and separate them at edge 1006. The same process can be utilized to activate/wake-up the processor 112 and/or other electronics of the wireless tape 102. The interconnect layer 118 is patterned to electrically connect the conductive plane 1002 to a GPIO port of the processor 112 and the conductive plane 1004 to the battery 114. For ease of illustration, the battery 114 is shown as a single component on the interconnect layer 118. However, as described earlier in relation to FIG. 3, the battery 114 can be a layered structure on multiple layers of the wireless tape 102. The cutting means 115 can be made of a metal material, which can electrically connect the conductive planes 1002 and 1004 during the shearing of the edge 1006, thereby generating a signal at the GPIO port of the processor 112 from the battery 114. The signal at the GPIO port of the processor 112 can wake-up and activate the processor 112. The processor 112 can send beacons to nearby smart devices 103 for connection and communication.

In another implementation, the conductive planes 1002 and 1004 can be patterned on the same surface of the interconnect 118 and on the opposite edges 1014 and 1016 of the wireless tape 102, respectively. The conductive planes 1002 and 1004 can be electrically connected to conductive planes 1008, 1010, respectively. The conductive planes 1008 and 1010 are formed on an external surface 1018 of the wireless tape 102, from an electrically conductive and adhesive material, on the opposite edges 1014 and 1016 of the wireless tape 102, respectively. The conductive planes 1002 and 1004 and the conductive planes 1008 and 1010 are electrically coupled via interconnect patterns in the interconnect layer 118 to the terminals of a GPIO port 1012 of the processor 112. In this arrangement, the conductive planes 1002, 1004, 1008 and 1010 form an open switch between the terminals of the GPIO port 1012. When a user of the wireless tape 102 intends to activate the wireless tape 102, he can bring the opposite edges 1014 and 1016 of the wireless tape 102 together and adhere the conductive planes 1008 and 1010 together. Connecting the conductive planes 1008 and 1010 closes the switch and connects the terminals of the GPIO port 1012, generating a signal in the processor 112 and causing the processor 112 to wake up and begin transmitting beacons for connection and communication. In another implementation, the conductive planes 1008 and 1010 from the external surface 1018 of the wireless tape 102 can be routed to the terminals of the GPIO port 1012, directly or via interconnect patterns in the interconnect layer 118. In this scenario, the conductive planes 1002 and 1004 on the interconnect layer 118 can be excluded and not manufactured.

Example Applications of the Object Tracking System 100

In one implementation, a process of setup and configuration of the wireless tape 102 can configure a wireless tape 102 to track an item. The wireless tape application 121 can be running in the background. When a wireless beacon from a wireless tape 102 is received, the wireless tape application 121 can determine whether it has encountered this wireless tape 102 before. If it is determined that the wireless tape 102 is encountered for the first time, the wireless tape application 121 can prompt the user to assign the wireless tape 102 to an item the user wishes to track. The user can also physically affix the wireless tape 102 to the item using the adhesive layer 304. Upon reception of any beacon from a wireless tape 102 at the device 103, the wireless tape application 102 can query the local database 120 to determine if the beaconing wireless tape 102 is already registered and configured with the wireless tape application 121. If the wireless tape 102 is not registered, the wireless tape application 121 can query the remote database 122 to determine if the wireless tape 102 has been registered with another user. If neither is true, the wireless tape application 121 prompts the user for additional information regarding the item and registers the wireless tape 102 with the user and the associated item. In some implementations, the use can provide a descriptive text string, such as, "passport," or "umbrella." In other implementations, the user may use a camera device of the smart device 103 to capture an image of the item, which can be associated with the wireless tape 102.

The prompt for additional information during registration of a wireless tape 102 and its associated item, may also give the user options to set how the wireless tape application 121 should behave as to the associated item. For instance, the wireless tape application 121 can be configured to send reminders regarding a tracked item if some predefined conditions are met. For example, the wireless tape application 121 can be configured to remind a user to bring a tagged passport on a future date, if on that date, the tagged passport is not detected to be with the user, to bring a tagged umbrella if rain is expected in the weather forecast and the tagged umbrella is not detected to be with the user, as the user leaves the home-base geofence.

In some implementations, the setup process of a wireless tape 102 can include a machine learning mechanism to reduce the need for user input during the setup of the wireless tape 102. Simply sticking the wireless tape 102 on items of importance in the user's daily life, the wireless tape application 121 can learn what the user typically brings with him from place to place during the day. It can anticipate this by employing machine learning algorithms that may also employ external variables including the weather and the user's digital calendar. If, for example, the user always brings his gym bag on Tuesdays and Thursdays, the wireless tape application 102 may predict that the user needs the gym bag on these days. It may be that the user happens to have meetings on those days that are near the gym. The learning mechanism may predict that if the user has a meeting with the same person on a Wednesday, the user may also need the gym bag and a notification can be sent reminding the user to bring the gym bag.

A machine learning model may be trained based on data collected from the user to determine the conditions under which certain items are typically with the user. In this way, the machine learning model may be trained to predict, based on conditions, which items should be in the user's possession. Training may involve determining when an item is in the presence of the user based on receiving the beacon from the wireless tape 102. The conditions at the time that the wireless tape 102 is present may also be determined, such as the day of the week, time of day, weather, presence and identity of other users in the vicinity, and so on. The aforementioned data may comprise training examples used to train the machine learning model to build an association between input conditions and a prediction of whether the item is present or not.

After training, a set of conditions of any of the aforementioned types, may be input to a machine learning model. The machine learning model may then output a prediction, based on those conditions, of which items should be in the possession of the user and at what times. When it is determined that one of the predicted items is not in the presence of the user (for example, no beacon from an associated wireless tape 102 is received), then an alert may be triggered.

Some examples of reel-to-reel manufacturing processes and manufacturing considerations will now be described. In some implementations, the wireless tape 102 is fabricated to include a series of wireless tracking labels, in which each wireless tracking label can include a wireless communication circuit 111, a processor 112, a timer 113, a battery 114, and a memory module 117.

A fabricated reel of wireless tape 102 formed on a flexible substrate 116 includes many individual wireless tracking labels. This leads to several issues. First, a reel of wireless tape may be stored for some period of time before it is cut into different individual wireless tracking labels. Individual tracking labels may not necessarily be immediately used at the time of cutting. However, as discussed above, the processor(s) and communication circuit(s) may be activated as required. That is, an individual wireless tracking label may be awakened from a hibernation or sleep state close in time to when an individual tracking label is to used. That can include activating a wireless tracking label in response to cutting it from a reel. It can also include a wireless tracking label waking up in response to receiving energy from an external device. As discussed above, a coil on a wireless tracking label may receive energy from an NFC reader or other source that is used to generate a wakeup voltage.

In the context of a wireless tracking label, in some end-use applications, the wireless tracking label may only need to be active for less than a month to support, for example, tracking the shipment of a package in a supply chain.

Keeping individual wireless tracking labels in a hibernation mode until close to the time they are used extends the lifetime of the battery 114. This supports, for example, the option to omit using solar cells to harvest energy.

In a reel-to-reel manufacturing process, it's desirable to design the layers used to optimize several goals. First, while the underlying substrate is flexible, it's desirable to minimize the number of unnecessary layers and the number of critical alignments in the manufacturing process. It's also desirable that the overall manufacturing process minimizes the likelihood of defects (e.g., pinholes or other sealing defects) that would increase the permeability of the battery pouch 308 to water vapor, oxygen, or other deleterious gases that might potentially shorten battery lifetime. Moreover, depending on the electrolyte chemicals used, preventing deleterious evaporation of the electrolytes may also be a concern in designing the battery pouch.

The lifetime of the battery will depend at least in part on the quality of the battery pouch 308 as a barrier to water vapor, oxygen, or other deleterious gases. The battery pouch 308 also serves as a barrier to prevent the evaporation of electrolytes.

Depending on the end-use application, a wireless tracking label may, in some cases, only require the battery 114 and battery pouch 308 design to be sufficient for the battery 114 to last through some initial time period in a hibernation state prior to use and provide, after activation, sufficient power for typical wireless tracking applications. For example, in many shipping applications, the total shipping time may be less than a month when taking into account all the different legs of the shipment process.

The electrochemical components of the battery 114 may include electrolyte chemicals including at least one member from the group consisting of $ZnSO_4$, $ZnCl_2$, $MnSO_4$, $AlCl_4$. These types of electrolyte chemicals are safer and more environmentally friendly than some alternatives such as lithium cell batteries. An advantage of lithium based cells have nominal voltages of 3.0 or 3.6 V and up to 4.2 V fully charged. In contrast, many other electrochemical cells have a nominal voltage that is much lower, e.g., around 1.5 V in many cases. However, many communication and processor chips are designed to work in voltage ranges above 3.0 V. In fact, due to the wide-spread use of lithium batteries, many communication and processor chips are designed to work off the typical voltage ranges of a lithium battery.

This means that to directly replace lithium cell type batteries (without using voltage multiplier chips or specialty low-voltage chips designed to work at low voltages) requires connecting several 1.5 V electrochemical cells in series.

It should be understood that the battery 114 includes cathode and anode current collectors, a separator, and electrolyte. The current collectors may, for example, be based on carbon layers or a carbon-coated aluminized interconnect layer.

As previously discussed, the battery pouch 308 containing electrochemical components of the battery 114 can be formed on the interconnect 118. The substrate 116 can be an ultrathin and flexible material such as a polyester or Polyethylene terephthalate (PET), although other materials may be used.

One aspect that should be understood is that the battery pouch 308 is designed to provide an impermeable barrier to deleterious water vapor and deleterious gases such as oxygen. The battery pouch 308 is also designed to prevent the electrochemical components of the battery from evaporating.

In some implementations, a battery pouch has a multilayer film to protect the battery. For example, as illustrated in FIG. 11A, a battery pouch may be formed from a multilayer film, which may include a polypropylene (PP) composite layer, an aluminum layer (Al), a biaxial oriented nylon layer (ONY), a PET layer, and other optional layers.

But as illustrated in FIG. 11B, the battery pouch may be formed from other sequences of layers that provide the function of serving as a barrier to water vapor and deleterious gases, as well as preventing evaporation of the electrochemical components.

Referring to FIG. 11C, the battery pouch 308 is formed by using one or more interconnect layers 118A, 118B to form at least one side of the battery pouch 308. The bottom interconnect layer 118A is formed on flexible substrate 116. In FIG. 11C, a bottom interconnect layer 118A forms a bottom side of the battery pouch 308. A top interconnect layer 118B may also, in some implementations, be used to form a top side of the battery pouch 308. As an example, some types of interconnect layers, such as aluminum, are impermeable to deleterious gases. The overall battery pouch 308 includes barrier layers to form a barrier for the battery 114, which in this example includes two electrochemical cells 1105 with a series electrical connection 1110. As indicated by the dashed line, a series connection 1110 may be formed between at least two electrochemical cells 1105. This is useful in which individual electrochemical cells produce a voltage of around 1.5 V, such as electrochemical cells having electrolytes such as $ZnSO_4$, $ZnCl_2$, $MnSO_4$, or $AlCl_4$.

Figure 11D:
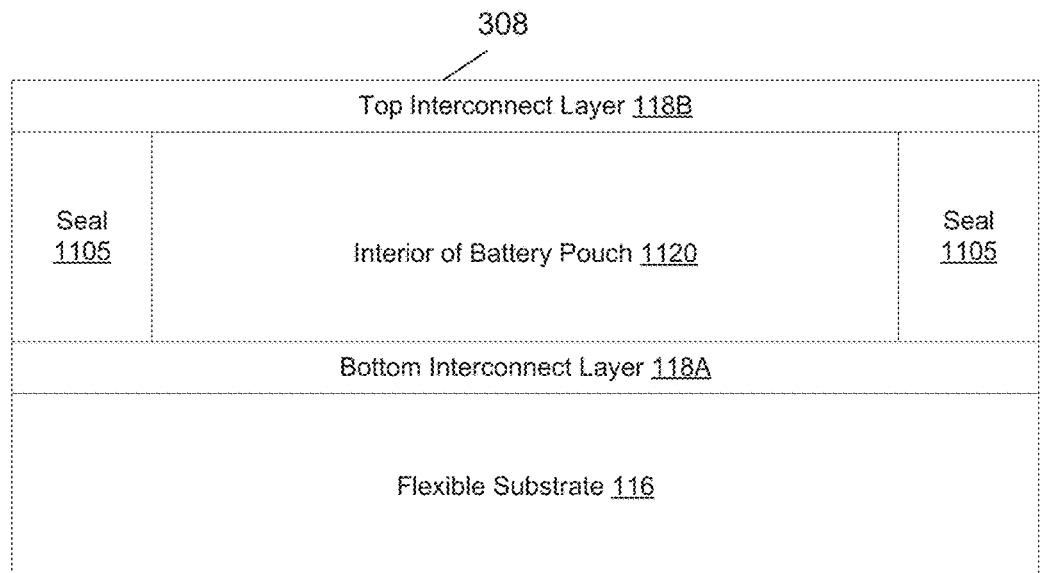
FIG. 11D is a side view illustrating how an interconnect layer forms a portion of a battery pouch in accordance with an implementation.

Referring to FIG. 11D, one or more interconnect layers, such as a bottom interconnect layer 118A and a top interconnect layer 118B, may be used to form at least parts of the top and bottom sides of the battery pouch 308 having an interior region 1120 to house electrochemical components (not shown in FIG. 11D). Additional seals 1105 may be formed to complete the battery pouch 308.

Figure 11E:
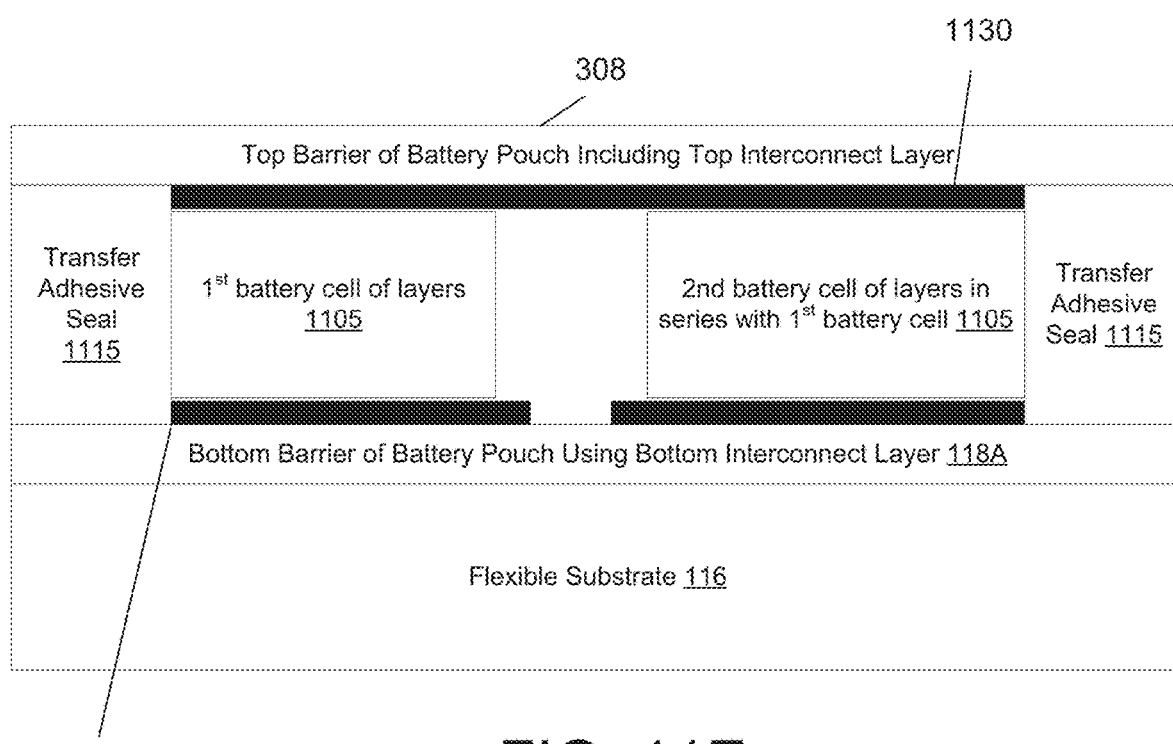
FIG. 11E is a side view illustrating another example of how an interconnect layer forms a portion of a battery pouch in accordance with an implementation.

Referring to FIG. 11E, in some implementations the seal regions are formed from a transfer adhesive 1115. The transfer adhesive 1115 used to form the seal regions may be selected to be electrically insulating. Many variations on the interconnect layer design and current collector layers 1130 are possible to form a series electrical connection between at least two electrochemical cells.

Figure 11F:
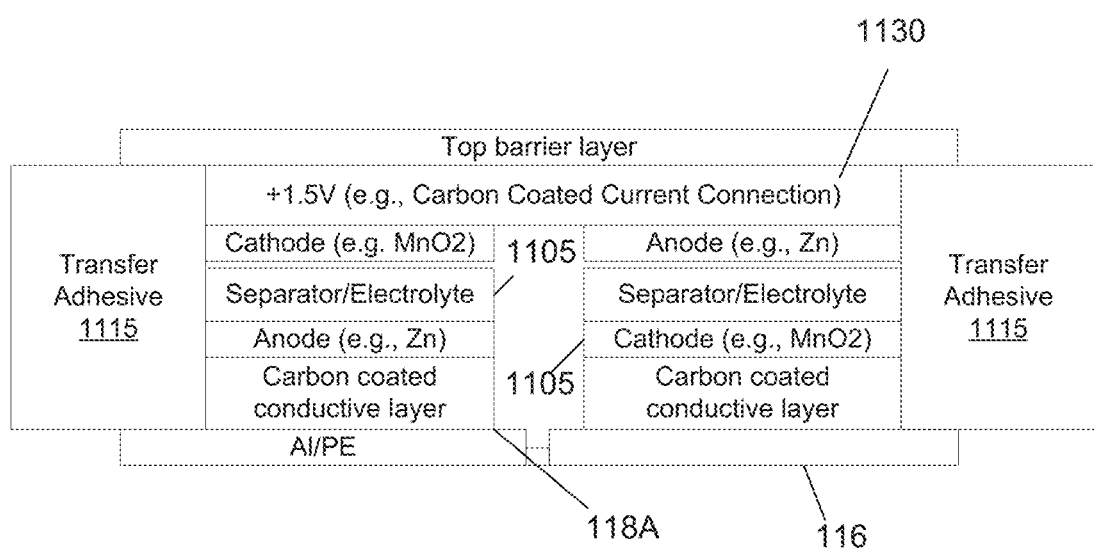
FIG. 11F is a side view illustrating an example of a battery and battery pouch formed in the Zn and $MnO_2$ system in accordance with an implementation.

Referring to FIG. 11F, as an illustrative but non-limiting example, the bottom interconnect layer 118A may be formed of aluminum layer formed on a flexible PE substrate. The anodes may be formed from Zn, and the cathodes from $MnO_2$. Each electrochemical cell may include a separator, such as cellulose, with an electrolyte. A variety of different manufacturing processes may be used to support current collection and an electrical series connection between the electrochemical cells. This may include carbon layers as one option.

Figure 12A:
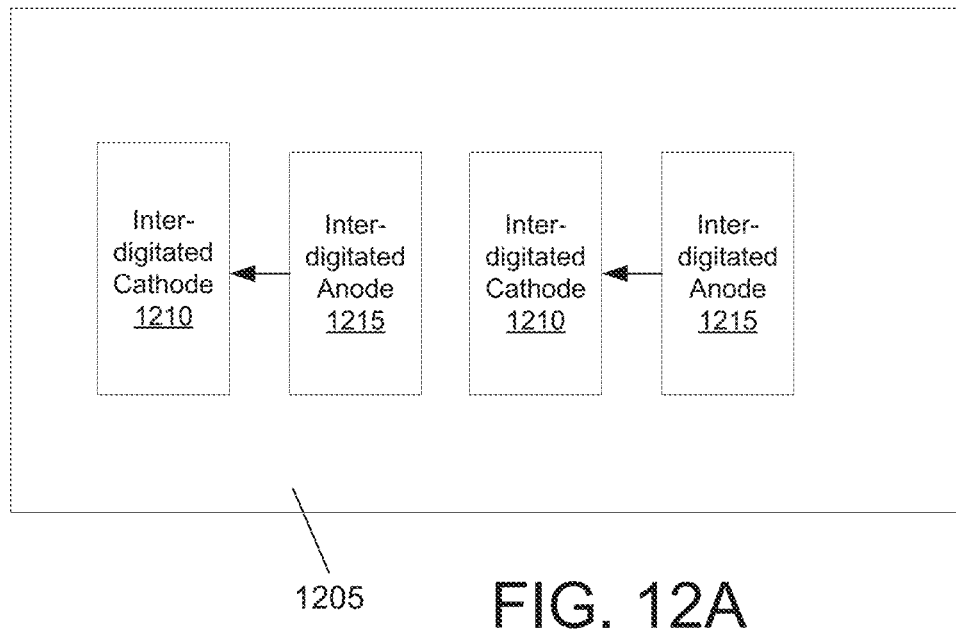
FIG. 12A is a top view illustrating a coplanar battery with interdigitated cathodes and anodes in accordance with an implementation.
Figure 12B:
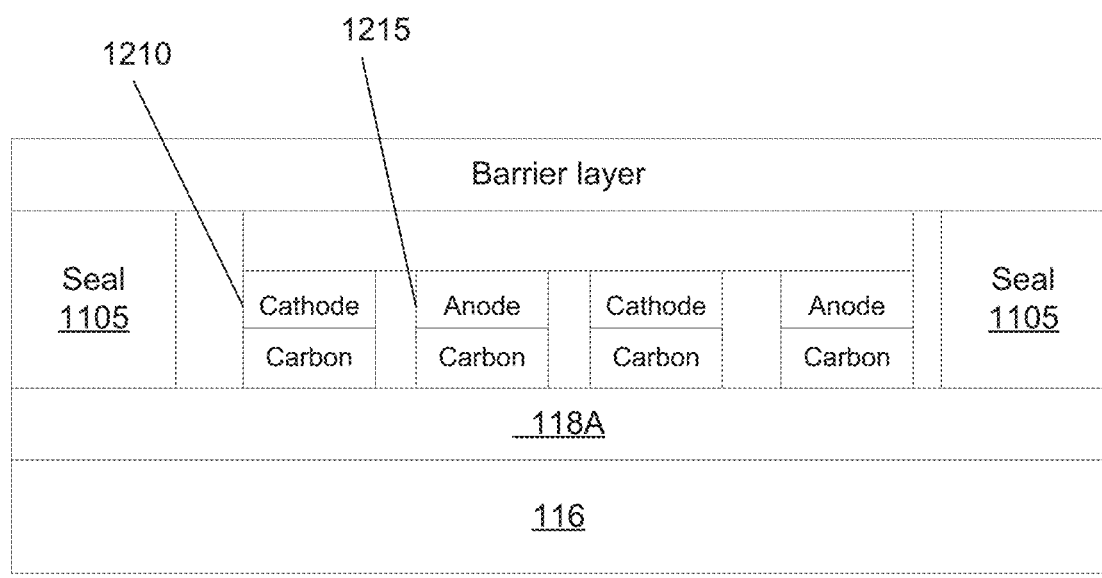
FIG. 12B is a side view of a coplanar battery and battery pouch in accordance with an implementation.

In some implementations, the battery structure 1205 is co-planar in that it is formed using interdigitated cathodes 1210 and anodes 1215 with a lateral flow of ions. FIG. 12A is a top view of co-planar design (not to scale). FIG. 12B is a side view, illustrating alternating cathode regions 1210 and anode regions 1215. In a co-planar design, there is a lateral ion flow between laterally adjacent interdigitated anode and cathode regions. That might be contrasted with a planar design in which the ion flow is vertical with respect to cathode and anode layers in the same vertical stack.

While a bottom and/or top interconnect layers 118A, 118B can be used to form part of the battery pouch 308, a variety of other materials may also be used to form part of the battery pouch. A variety of materials may be used to form a portion of the battery pouch, including thermochromatic paper, resin coated face stock, etc. A wide variety of materials are good barriers by themselves or can be made impermeable by, for example, adding resins, waxes, or various sol gel processes and coatings. In one implementation, transfer adhesive is used to form the edge seals.

By appropriate selection of layers, an individual interconnect layer forms at least a portion of one side of the battery pouch. This provides a variety of manufacturing benefits. It reduces the total number of layers required, simplifies manufacturing, and improves the reliability of the battery pouch in a reel-to-reel manufacturing process. In a reel-to-reel manufacturing process the electrical connections, layers, and seal regions are stored (at least for a while) on a reel with a radius of curvature such that upper layers of a given section of wireless tape 102 have slightly greater elongation of upper layers due to the radius of curvature. Simplifying the overall design of the battery pouch and reducing the number of layers improves manufacturability and reduces the likelihood sealing defects in the barrier and/or failures of electrical connections.

Figure 13:
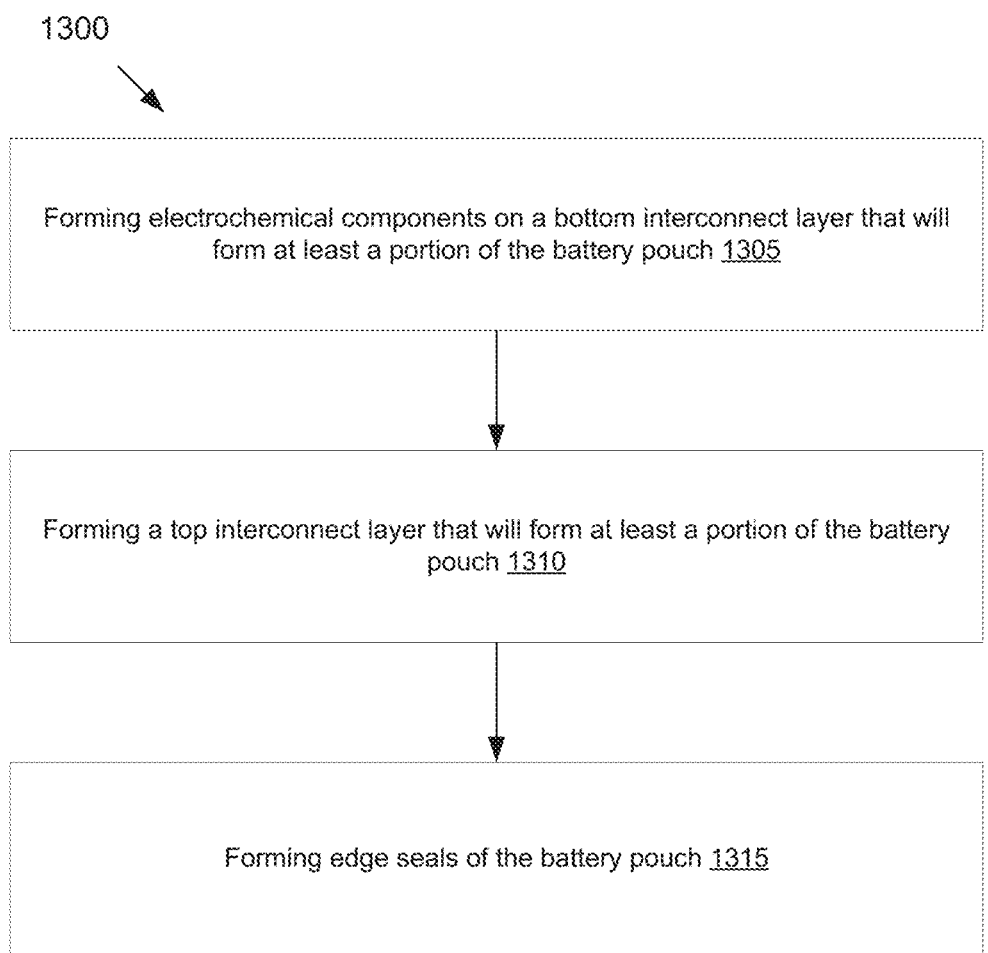
FIG. 13 is a flow chart of a method of forming a battery pouch in accordance with an implementation.

As illustrated in the flow chart 1300 of FIG. 13, a high-level method or process may include forming electrochemical components of the battery on a bottom interconnect layer that acts as at least a portion of bottom barrier layer in block 1305. A top interconnect layer that acts as at least a portion of top barrier layer may be formed on the battery pouch in block 1310. In block 1315, additional seals and/or seal layers may be formed to complete the battery pouch.

Figure 14:
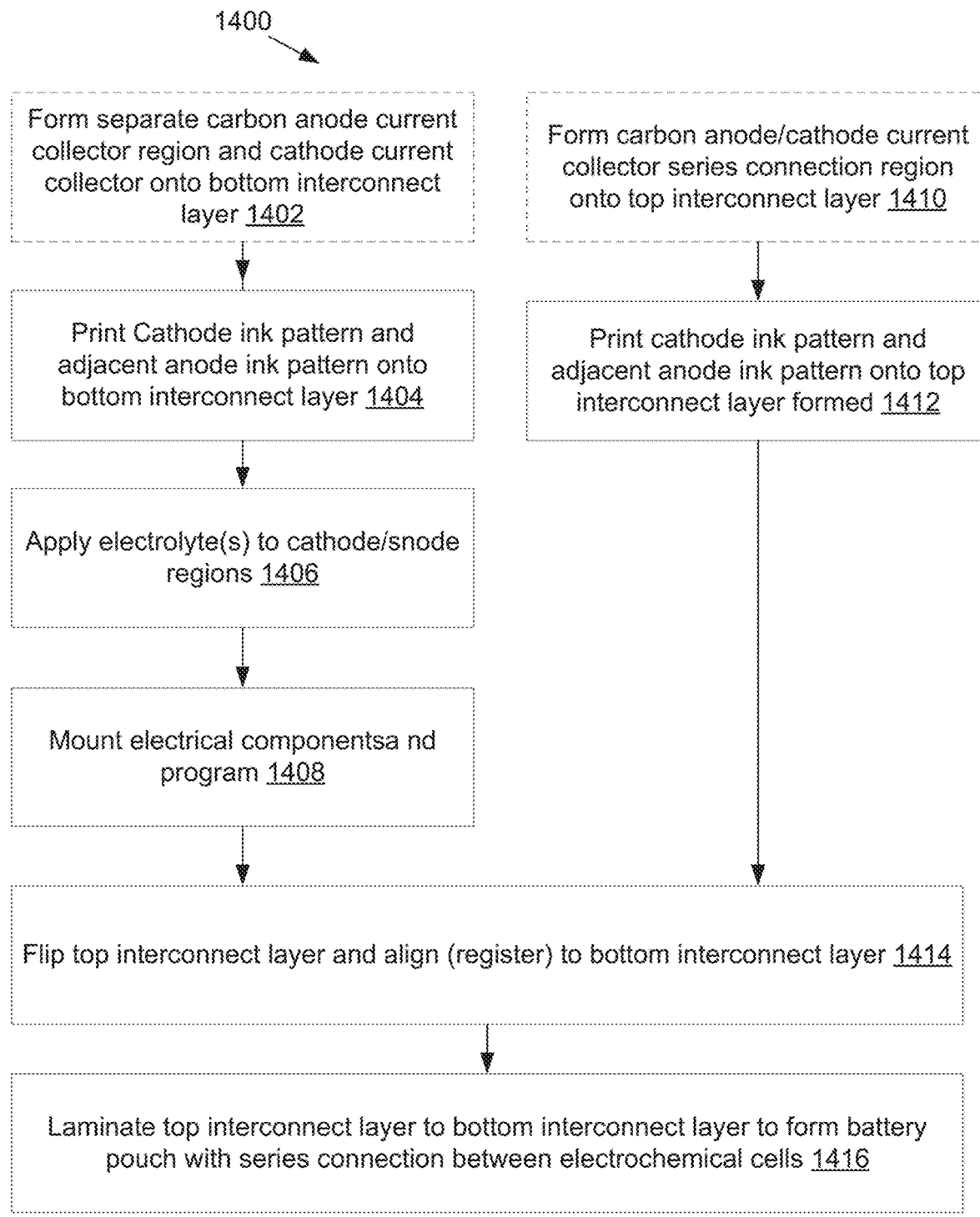
FIG. 14 is a flow chart of a planar fabrication process in accordance with an implementation.

FIG. 14 is a flowchart 1400 of an example of a planar process with additional details illustrated in FIGS. 14A, 14B, 14C, 14D, and 14E. As illustrated in FIG. 14 there is initially a separate (but parallel) set of reel-to-reel processes for forming what will be the top and bottom interconnect layers of a wireless tape 102. In the fabrication process, the top interconnect layer may be flipped over and aligned to the bottom interconnect layer, with top and bottom interconnect layers laminated to each other. The overall process can be implemented in a reel-to-reel process.

Figure 14A:
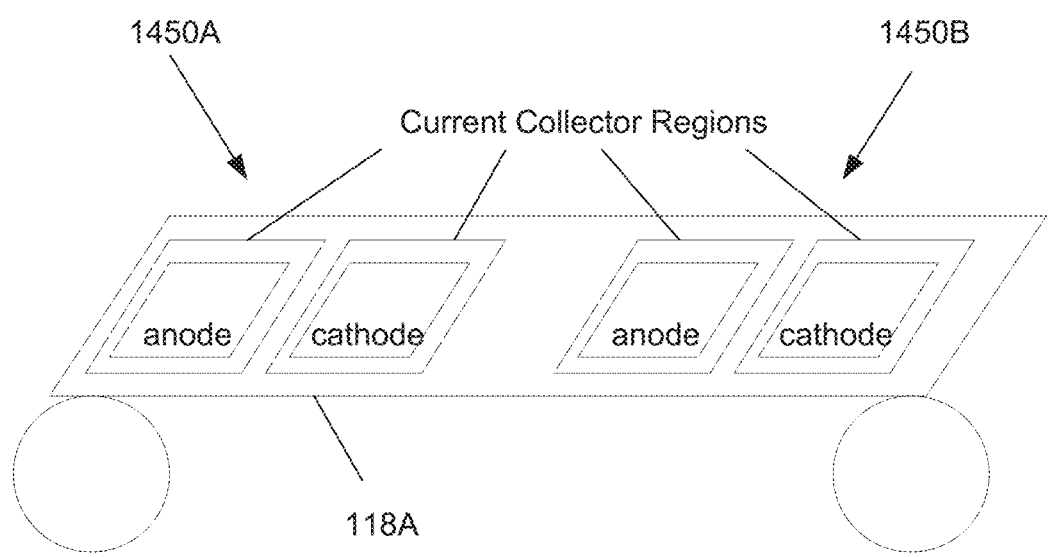
FIGS. 14A, 14B, 14C, 14D, and 14E illustrate aspects of the flowchart of FIG. 14.

FIG. 14A illustrates the result of initial steps 1402 and 1404 in a planar process. There is a printing of a cathode layer with ($MnO_2$—C-PVDF) ink and an anode layer on (Zn—C-PVDF) ink onto a first interconnect layer, corresponding in the figure to a bottom interconnect layer. The bottom interconnect layer serves as an impervious battery pouch material. As examples, the first interconnect layer may include a liner or the underside of face stock material or thermal chromatic paper.

FIG. 14A shows an anode and cathode pair of what will become a first wireless tracking label device 1450A and an anode and cathode pair of second wireless tracking label device 1450B along the tape. Thus, in this example, as the reels (the circles) are rotated, a certain number of individual wireless tracking labels are fabricated by printing in windowed/masked areas, the appropriate inks to fabricate anode and cathode regions. The current collectors as part of the anode and cathode regions or structures may be served by the conductive nature of the interconnect layer itself or enhanced by additional coatings such as carbon or carbon nanotubes.

Figure 14B:
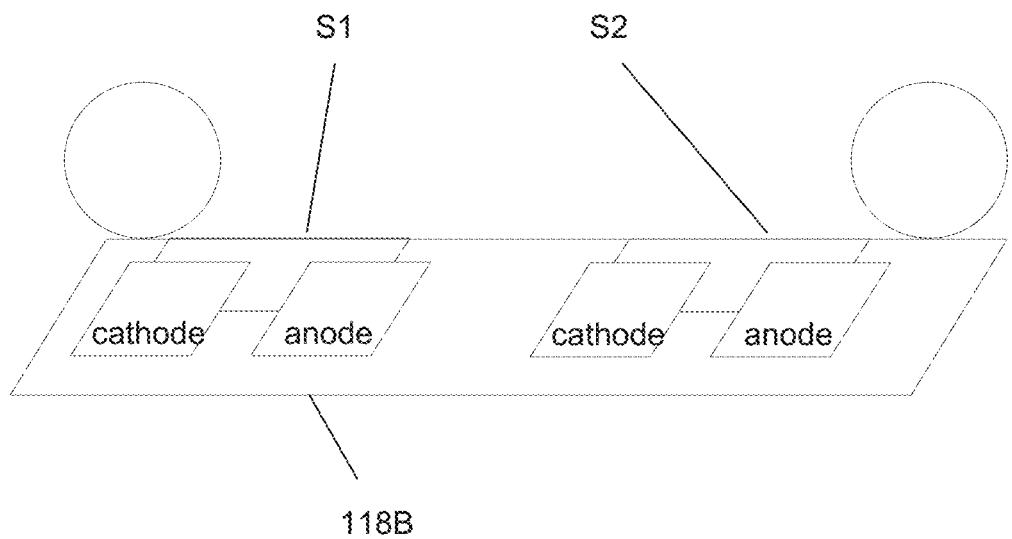

FIG. 14B illustrates printing of a cathode layer with ($MnO_2$—C-PVDF) ink and an anode layer on (Zn—C-PVDF) ink onto a second interconnect layer, which also will serve as an impervious battery pouch material. In one implementation, the anode and cathode inks, Zn—C and MnO2, respectively, are coated on top of carbon. The carbon is coated on top of the aluminum-PET or just the PET in the interconnect layer. However, carbon is not always required on top of aluminum PET. This corresponds generally to the result from steps 1410 and 1412. The second interconnect layer 118B may be a liner or the underside of face stock material or thermal chromatic paper. The second interconnect layer 118B may, as illustrated in the figure, be a top interconnect layer. The top interconnect layer in this example also has two label devices along the wireless tape. Conductive sections S1 and S2 (e.g., carbon, copper, carbon-coating copper, etc.) are formed to create what will become a series connection between two electrochemical cells in the final fabricated devices.

Figure 14C:
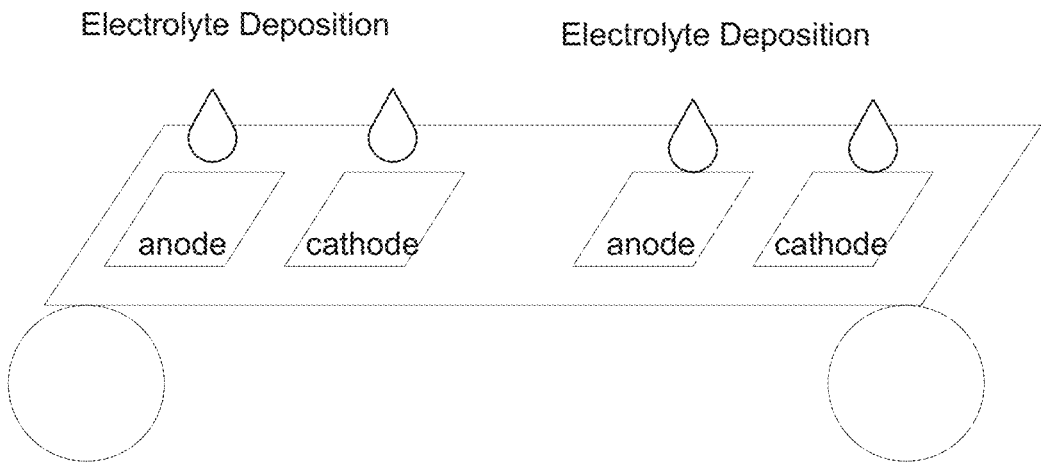

FIG. 14C illustrates a processing step to apply electrolyte in windowed regions on the anode and cathode regions on what will be the bottom interconnect layer. This corresponds generally to step 1406.

Figure 14D:
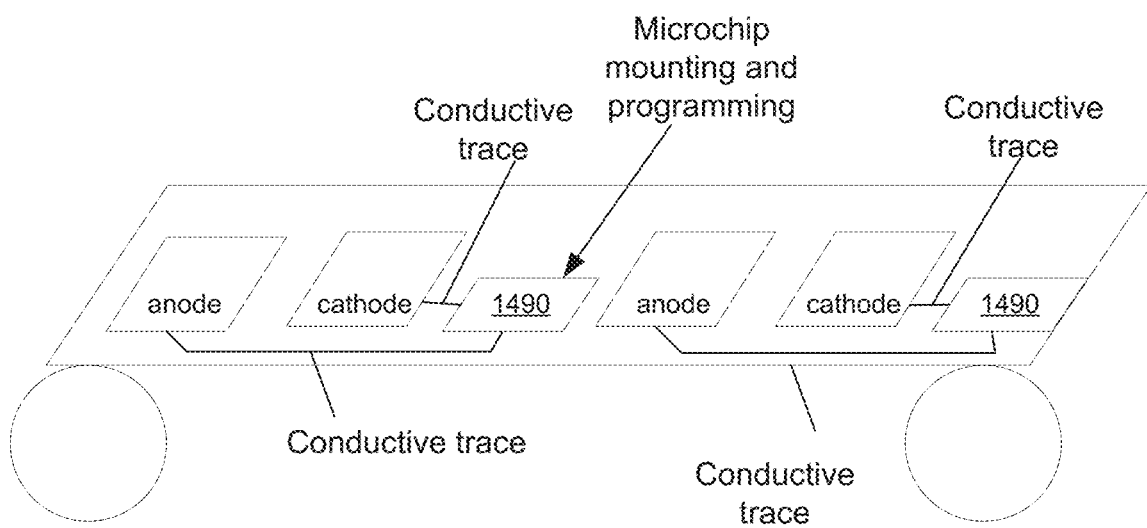

FIG. 14D illustrates mounting of electrical components 1490, such as an RF wireless processor and an RF wireless communication chip (e.g., a Bluetooth processor and a Bluetooth wireless communication chip). Conductive traces, directly connected to the current collectors, are formed to power the electrical components 1490. Programming of firmware may also be performed. Pogo pin landing pads (not shown) may be provided for the programming. FIG. 14D corresponds generally to step 1408.

Figure 14E:
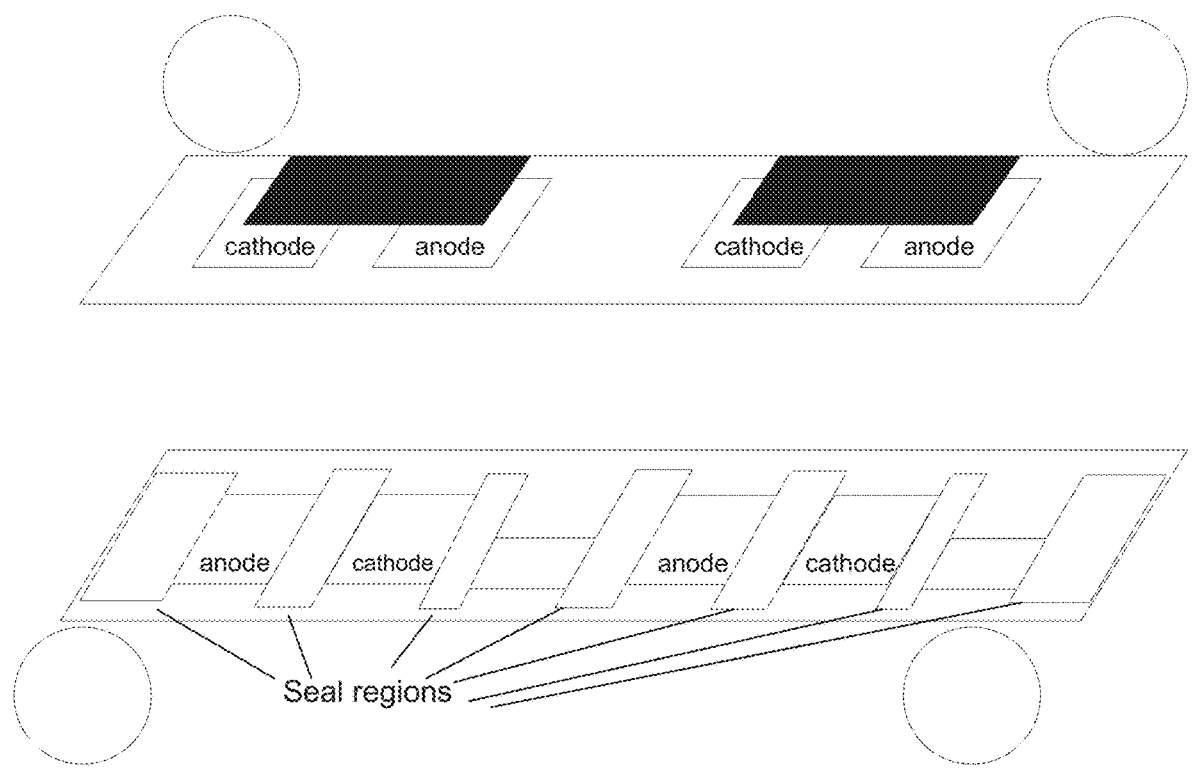

FIG. 14E illustrates how the top interconnect layer is flipped over and laminated to the bottom interconnect layer. This corresponds generally to steps 1414 and 1416. For example, in a reel-to-reel process a mechanical fixture may be used to slowly twist and rotate the top interconnect layer to flip it over. A registration technique (e.g., using optical fiducial marks or other alignment techniques) may be used to align the flipped top interconnect layer. Other mechanical components may by used to form the lamination, including adhesives, transfer adhesives, and/or thermal sealing techniques. This is what may be called a planar design in which electrochemical cell is a vertical stack of layers with a vertical flow of ions as indicated by the arrows.

Referring back to FIG. 14, in the process of FIGS. 14A to 14E, the initial process for forming the bottom interconnect layer may include forming anode and cathode current collectors in step 1402. In step 1404, cathode and anode ink patterns are formed. In step 1406, electrolytes are applied. In step 1408, electrical components are mounted and programed. For the top interconnect layer, in step 1410 anode and cathode current collector regions are formed. In step 1412, cathode and anode ink patterns are printed. In step 1414 the top interconnect layer is flipped over and aligned to the bottom interconnect layer. In step 1416 the top layer is laminated to the bottom interconnect layer.

Figure 15:
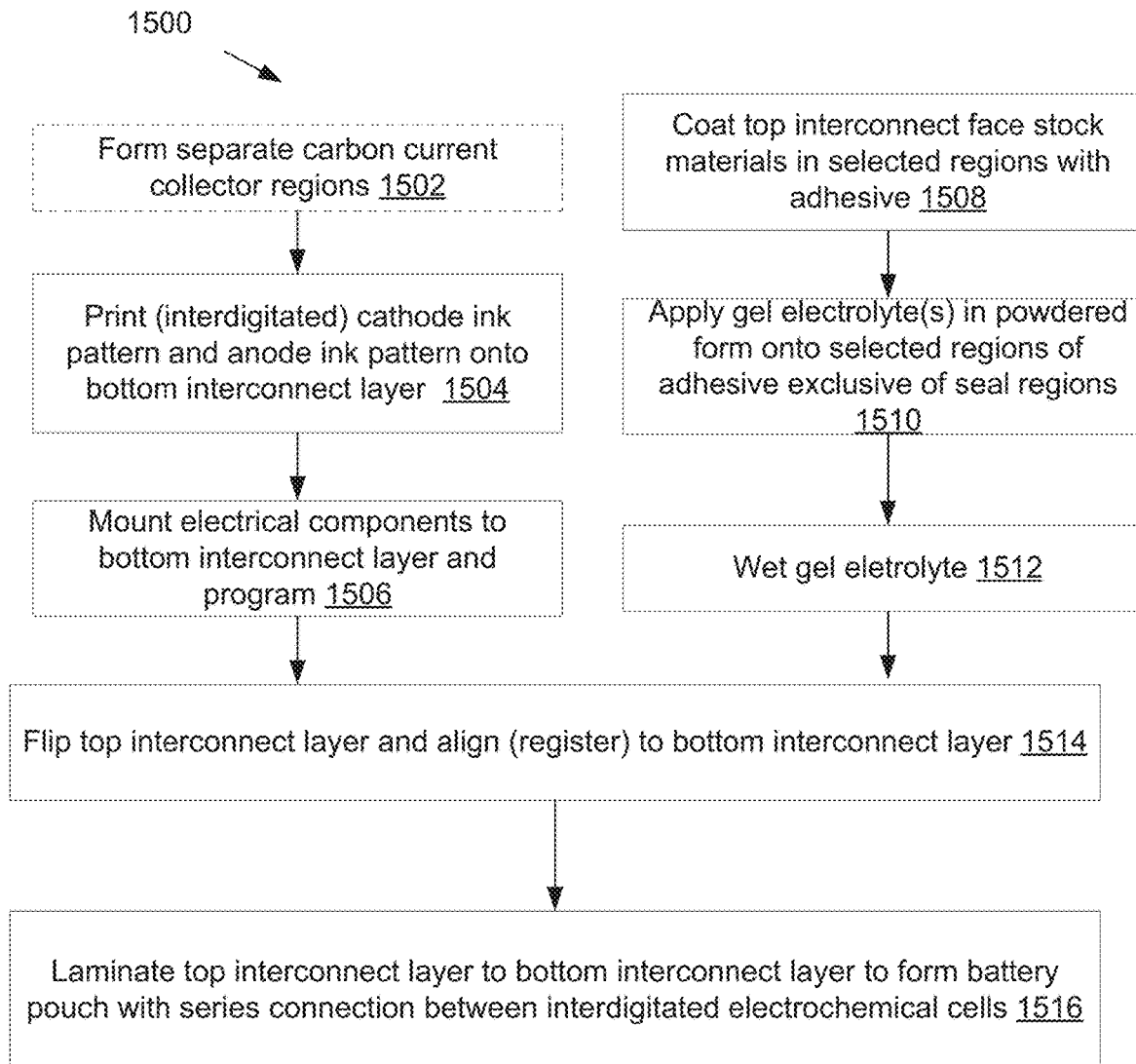
FIG. 15 is a flow chart of a coplanar process in accordance with an implementation.

An example of a coplanar fabrication process will now be described that also includes flipping a top interconnect layer and laminating it to a bottom interconnect layer. A coplanar fabrication has an interdigitated arrangement of anode and cathode regions with a horizontal flow of ions in each electrochemical cell (as previously discussed in regards to FIGS. 12A and 12B). An electrical trace is formed to form a series connection between electrochemical cells. FIG. 15 is a flowchart 1500 of a method of forming of a wireless tape 102. FIGS. 15A, 15B, 15C, 15D, and 15E illustrate aspects of the method.

Figure 15A:
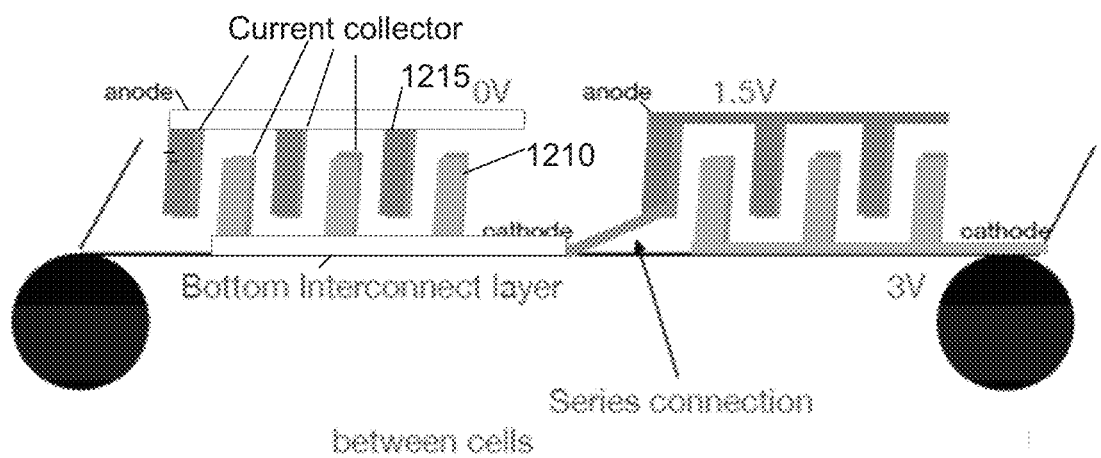
FIGS. 15A, 15B, 15C, 15D, and 15E illustrate aspects of the flowchart of FIG. 15.

FIG. 15A illustrates the result of steps 1502 and 1504 in regards to printing a cathode (e.g., $MnO_2$-PVDF) ink and anode (e.g., Zn—C-PVDF) ink onto a bottom interconnect layer 118A. The bottom interconnect layer will serve to form a portion of an impermeable battery pouch. As examples, the bottom interconnect layer may be formed from thermal-chromatic paper, or a liner or underside of a face stock material. It will be understood that a current collector layer (e.g., carbon) may be included. Each individual electrochemical cell has interdigitated anode 1215 and cathode 1210 regions with a lateral ion flow between interdigitated fingers. Two interdigitated electrochemical cells are illustrated, which may be connected in series, e.g., with an aluminum or copper electrical trace or other connection, such as inks to form these connections including carbon, silver, or carbon nanotubes. Thus, if each interdigitated coplanar cell produces 1.5V, two in series produces about 3V. The anode and cathode layers include a negative and positive current collector, respectively, which may be fabricated with carbon, copper, aluminum, carbon coated copper, carbon coated aluminum, carbon nanotubes, etc.

Figure 15B:
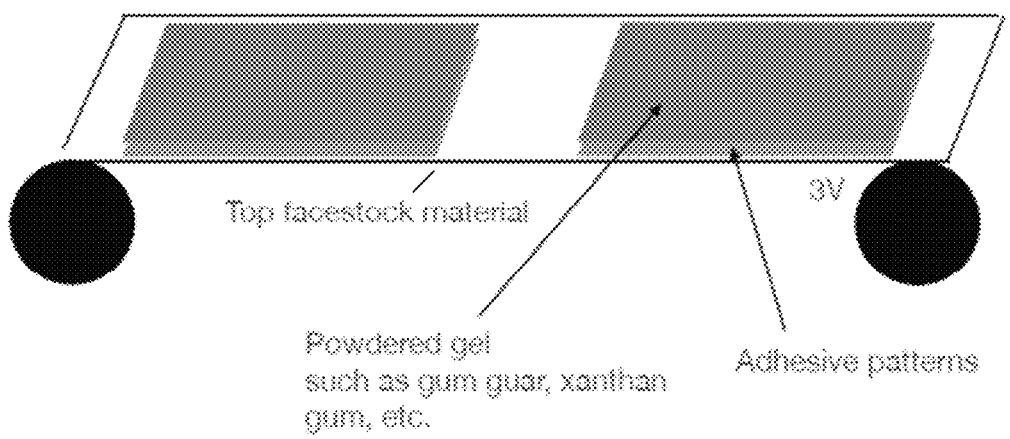

FIG. 15B illustrates a top interconnect layer having transfer adhesive regions onto which a powdered gel is applied (e.g., brush rolled). FIG. 15B corresponds generally to the result of steps 1508 and 1510. Fiducial marks can be detected along a moving web and a relative offset calculated for determining where to apply the transfer adhesive. A transfer adhesive is patterned onto 1) edge seal regions ("first regions") and 2) portions of the top interconnect to which electrolyte regions will be formed ("second regions"). The transfer adhesive forms a sticky side of a face stock material. The electrolyte may be formed on the second regions in two different ways. In one implementation, gum guar, xanthan gum, or a similar powdered material that forms a gel when wetted is initially deposited in a dry powdered form. For example, it may be deposited, in a powdered form in which it is brush rolled onto the adhesive patterns in the second regions. In one implementation, these second regions are later wetted by applying water vapor that includes an electrolyte. In another implementation, the electrolyte chemical, in a dry powdered form, is included in powdered gum guar, xanthan gum, etc., that is brush rolled onto the adhesive patterns. Water vapor is then applied to wet these regions, forming a gel electrolyte. In one implementation, top and bottom interconnect layers are processed to permit the top and bottom layers to be attached to each other to form the battery and battery pouch with transfer adhesive edges to form the edge seals.

Figures 15C, 15D:
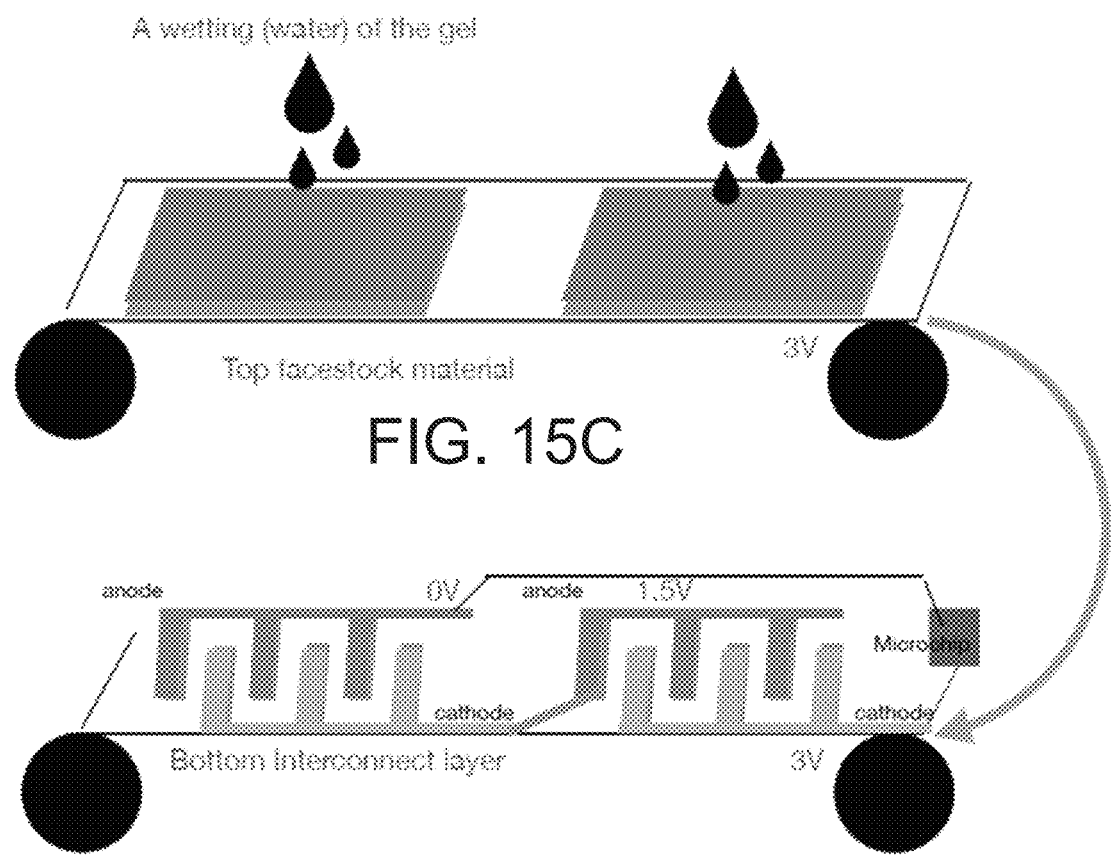

FIG. 15C illustrates wetting the gel (e.g., with water vapor) to form a semi-aqueous gel for the top layer). This corresponds to step 1512. As previously discussed, depending on implementation details, the water vapor may include the electrolyte. Alternatively, the powdered gel material may include the electrolyte material in dry form (e.g., a chemical salt) which becomes chemically active in the semi-aqueous gel.

FIG. 15D illustrates how electrical components, such as a Bluetooth processor and communication chips, are mounted to the bottom interconnect layer. Programming of microchip firmware may also be performed. This corresponds to the result of step 1506.

Figure 15E:
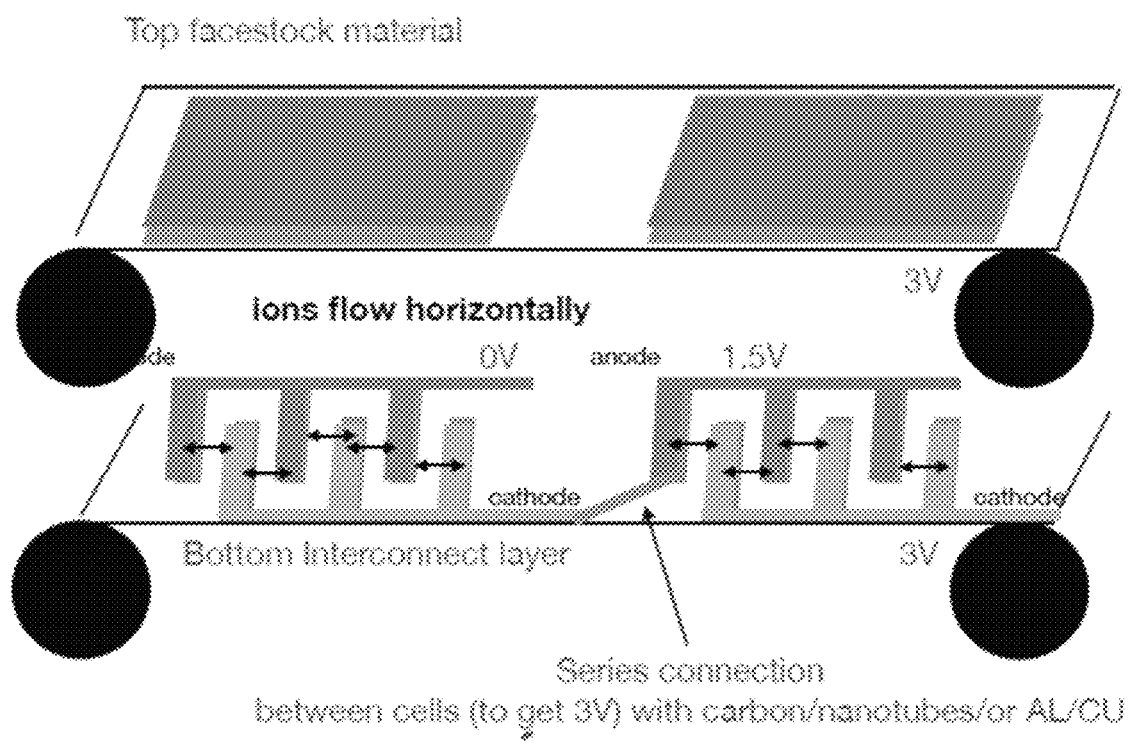

FIG. 15E illustrates that the top interconnect layer with the gel electrolyte that is to be laminated and sealed to the bottom interconnect layer with the transfer adhesive forming a seal of the battery pouch along the edges to form the battery pouch. This may include, for example, flipping the top layer over and aligning/registering it to the bottom layer. This corresponds to step 1516.

Referring back to FIG. 15, the process may include forming top and bottom barrier layers (e.g., on any suitable layer for forming an impermeable barrier) in which the interconnect layer(s) form portions of the battery pouch. The processing of the bottom layer may include forming current collector regions 1502, followed by printing 1504 interdigitated cathode and anode ink patterns. For the case of two electrochemical cells to be used in series, a series connection may be provided with an aluminum, copper as part of the interconnect layer itself, or from ink-based coatings which may include carbon, carbon nanotubes, or silver. Electrical components are mounted on the bottom layer in step 1506, along with any required programming (e.g., of firmware). For the top layer, adhesive is coated in selected regions in step 1508. In step 1510, a powdered gel is deposited on selected areas of the adhesive. In step 1512, the deposited powdered gel is wetted by, for example, exposing it to a source of water vapor (e.g., a fine mist or, for some materials, steam). Water applied to the powdered gel may include the electrolyte. Alternatively the electrolytic chemicals (in a powdered dry form) may be added to the powdered gel material. In step 1514, the top layer is flipped, aligned, and registered with the bottom layer. In step 1516 the top and bottom layers are laminated together.

One advantage of the process of FIG. 15 is that the adhesive used to form seals may be also used to form electrolyte regions.

Figure 16:
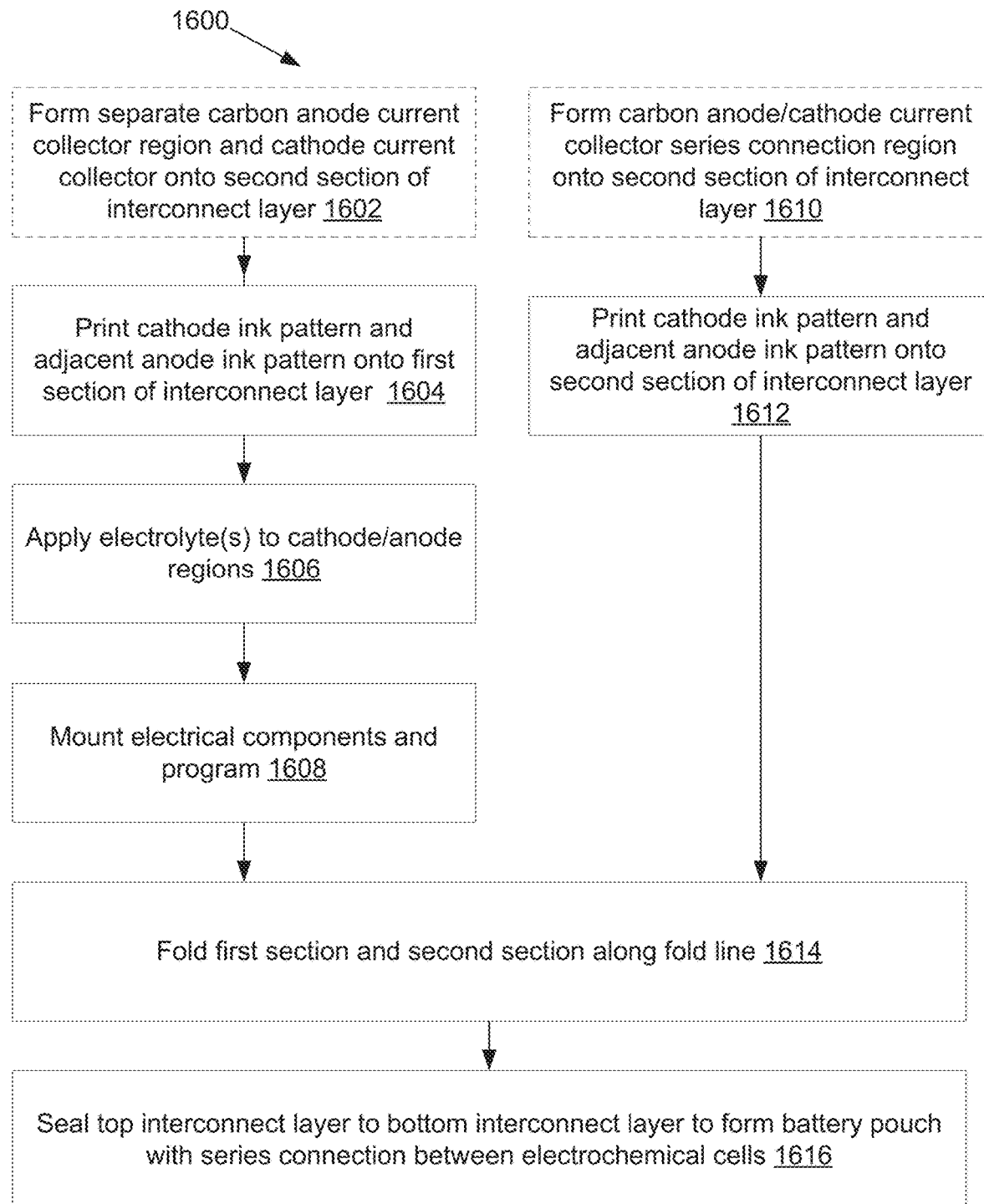
FIG. 16 is a flowchart of a planar fabrication process that includes folding in accordance with an implementation.
Figure 16A:
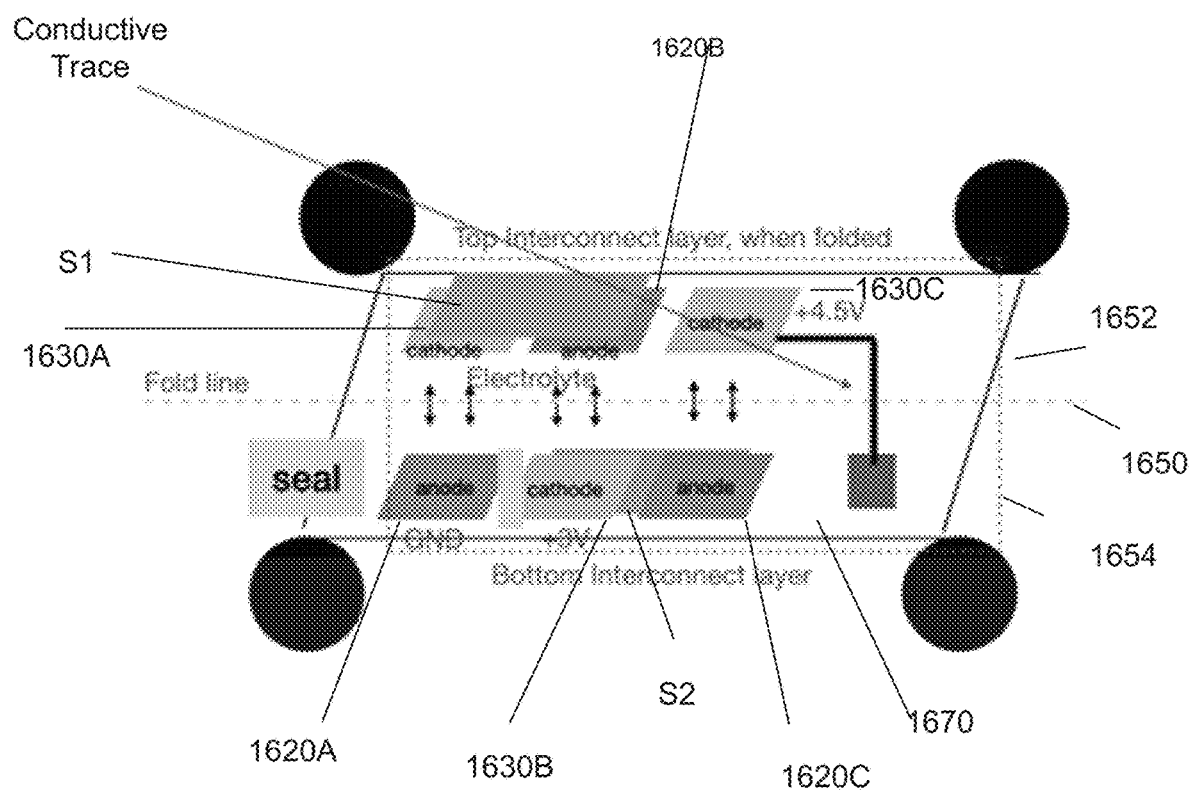
FIG. 16A illustrates aspects of the process of FIG. 16.

Referring to the flow chart of FIG. 16, and FIG. 16A in some implementations, a planar fabrication process 1600 uses a folding process to form of a wireless tape 102. For example, an anvil or other component may be used to force it to fold along a fold line. A folding process eliminates the need to precisely align two separate top and bottom interconnect layers. Thus, the fabrication process includes forming top and bottom interconnect layers on the same substrate/interconnect layer, mounting processor and communication chip components, and folding and sealing to form the battery and battery pouch.

A folding process facilitates fabrication in a reel-to-reel process because the folding is easier to perform than precisely registering separate top and bottom layers during a lamination stage. This is because the folding process forces a precise alignment.

Another advantage of a folding process is that it permits 3 electrochemical cells to be coupled in series. A conducive trace may be formed to connect the top and bottom without requiring welding, conductive adhesive or crimping.

FIG. 16A illustrates a fold line and how an interconnect layer is patterned to form top and bottom interconnect layers after folding. An interconnect layer 1670 has a top section 1652 and a bottom section 1654 and a fold line 1650 between the top section 1652 and bottom section 1654. An electrical trace may be formed to connect top and bottom layers as required after folding.

In the example of FIG. 16A, there are three anode/cathode pairs corresponding to three electrochemical cells in series, as illustrated by the vertical arrows. There is a first anode/cathode pair corresponding to anode 1620A and first cathode 1620A. There is a second anode/cathode pair corresponding to second anode 1620B and second cathode 1630B. There is a third anode/cathode pair corresponding to third cathode 1630C and third anode 1620C. This corresponds to what will become three electrochemical cells in series. There is a first series connection from a first connecting layer S1 and a second connecting layer S2. That is, S1 forms a series connection from first cathode 1630A to second anode 1620B. S2 forms to a series connection from second cathode 1630B to third anode 1620C. A conductive electrical trace forms a connection from third cathode 1630B to a voltage input (e.g., 4.5V). A ground connection is made to first anode 1620A.

S1 and S2 may, for example, include a carbon layer, an aluminum layer, or a copper layer. Folding on the fold line (illustrated by the center dashed line) and laminating/sealing results in 3 series connected electrochemical cells housed in a battery pouch to provide power to mounted electrical components. For the purposes of illustration, the vertical arrows illustrate the vertical ion flow in the final battery structure.

In some implementations, the materials of the interconnect layer may be selected for entire battery pouch to form a Faraday cage or RF shield. For example, a thin metal coating layer may be included as part of the interconnect layer to form a faraday cage after folding and laminating.

Referring back to FIG. 16, many aspects of the process are similar to previously described process steps for a planar process except that some process steps are done on different sections of the same interconnect layer and folding is used to fold different sections together. A top section (above the fold line) forms the top interconnect layer after folding. The bottom section (below the fold line) forms the bottom interconnect layer after folding. In block 1602, separate carbon anode and cathode current layers are formed on a second portion of an interconnect layer. In block 1604 adjacent cathode and anode ink patterns are patterned onto a first section of an interconnect layer. In block 1606, electrolytes are applied to cathode and anode regions. In block 1608, electrical components are mounted and firmware is programmed into the RF processor. For example, programming of firmware may also be performed using pogo pin landing pads (not shown in the figures). In block 1610, a carbon anode/cathode current collector series connection is formed onto the second section of the interconnect. In block 1612, adjacent cathode and anode ink patterns are printed onto the second section. In block 1614, the first and second section are folded along the fold line. In block 1616, the top and bottom interconnect layers are sealed for the battery pouch. As some examples, the sealing may be formed using a thermal lamination sealing process or by using transfer adhesive.

In addition to other manufacturing techniques previously discussed, in some implementations, an ultrasonic weld is used to weld one interconnect layer to another.

Figure 17:
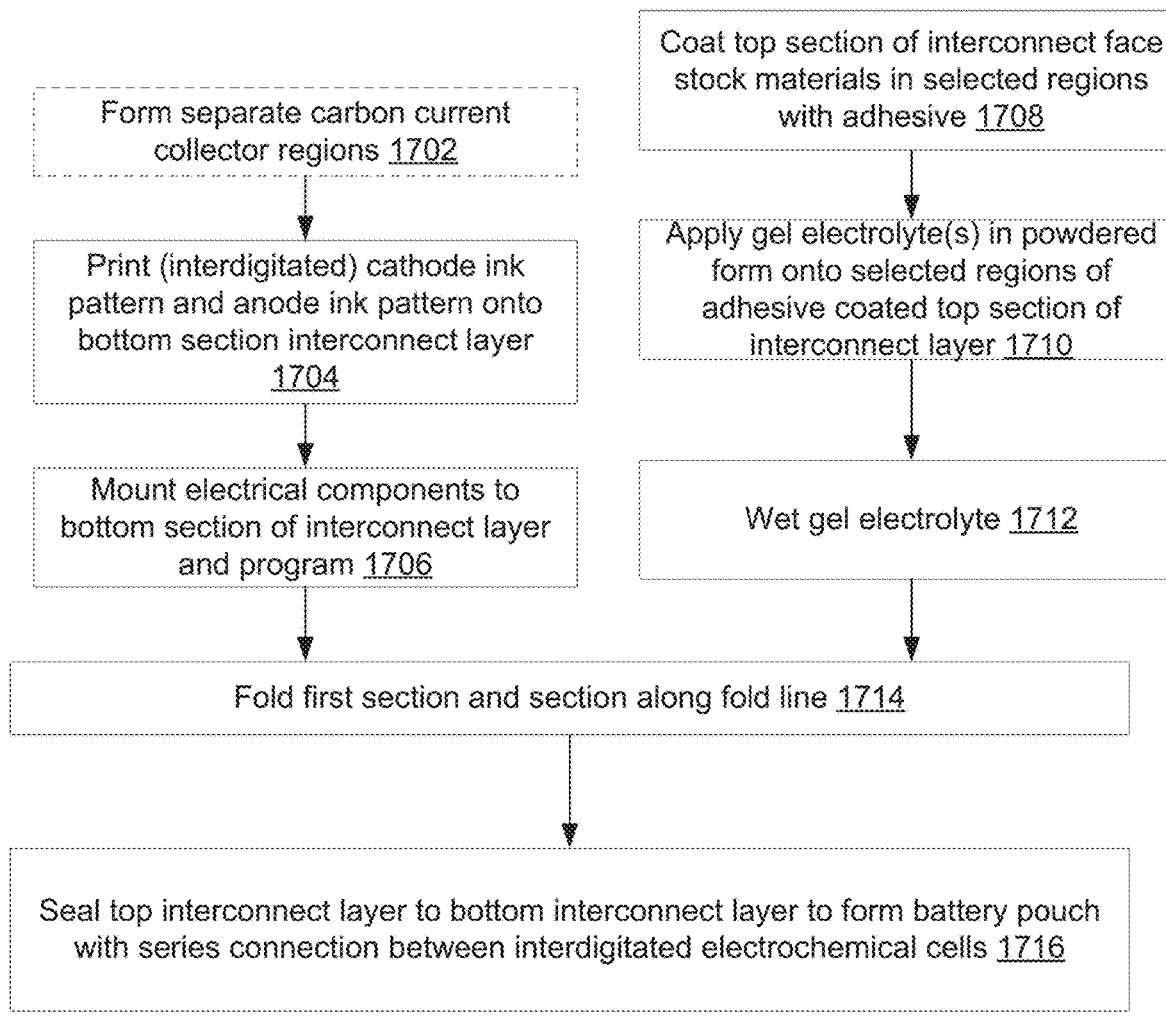
FIG. 17 is a flowchart of a coplanar fabrication process that includes folding in accordance with an implementation.
Figure 17A:
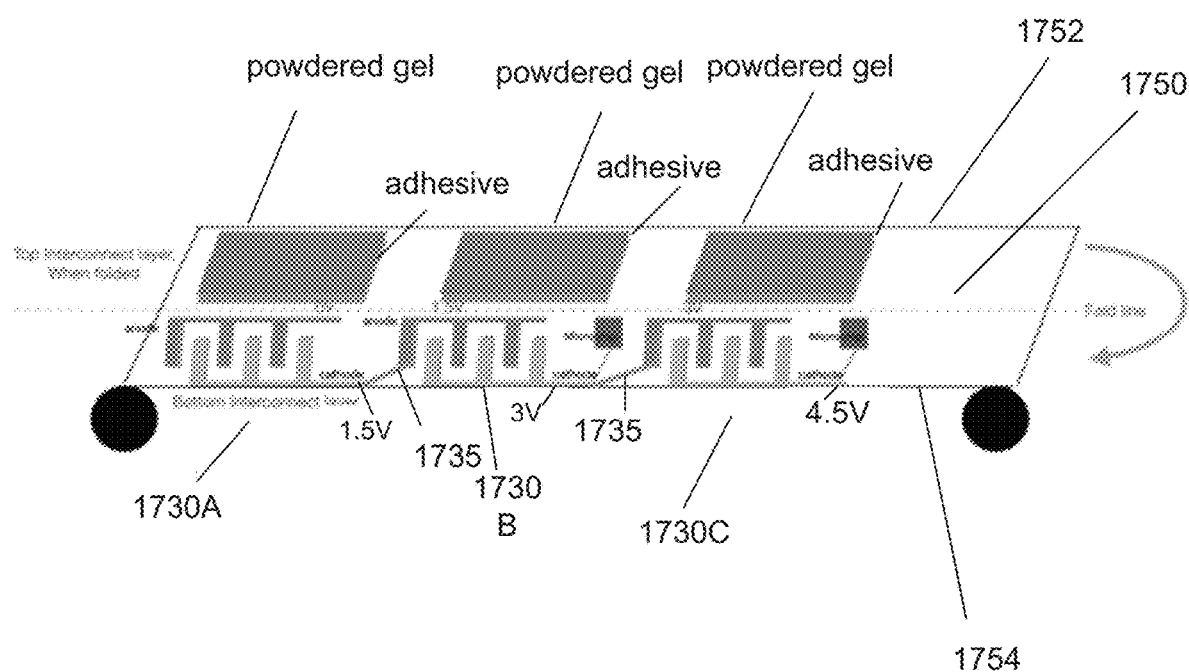
FIG. 17A illustrates aspects of the process of FIG. 17.

FIG. 17 and FIG. 17A illustrate an example of how the folding process may be applied in a co-planar design of a wireless tape 102. As illustrated by FIG. 17A, three interdigitated electrochemical cells 1730A, 1730B, and 1730C may be formed and connected in series to support running chips at 3.0 volts or 4.5 volts as illustrated in the FIG. 17A. Many of the details of the processing are similar to previously described coplanar designs. However, a top section 1752 and a bottom section 1754 are patterned to form top and bottom interconnect layers after folding on a fold line 1750. As previously discussed, the battery pouch may include a conducive layer or conducive coating such that after the folding process a Faraday cage RF shield is formed around critical components to eliminate emission of unwanted radiation. Referring back to FIG. 17, there is a first section below the fold line that will form the bottom interconnect layer after folding. There is a top section above the fold line that will form the top interconnect layer after folding. An exemplary method includes forming separate carbon current collector regions 1702. In block 1704, the interdigitated cathode and anode ink patterns are printed onto the bottom section of the interconnect layer. In block 1706, the electrical components are mounted to the bottom section of the interconnect layer and firmware is programmed. In block 1708, the top section of the interconnect face stock materials are coated in selected regions with adhesive. In block 1710, a gel material is deposited in powdered form (e.g., via brush rolling) onto the adhesive coated top section. The gel material is wetted in block 1712 to form a gel electrolyte. For example, water vapor may be deposited that includes an electrolyte. Alternatively, the dry powder may include the electrolyte chemical in a dry form (e.g., a salt) such that wetting the gel material with water generates a semi-aqueous gel with the electrolyte. In block 1714, the first and second section are folded along the fold line. In block 1716, the top interconnect layer and bottom interconnect layer of the folded structure are sealed to form the battery pouch around the interdigitated electrochemical cells.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A wireless tracking label tape, comprising:
a flexible substrate;
an interconnect layer formed on the flexible substrate and patterned to electrically couple a plurality of electrical circuits including a wireless RF communication processor and a wireless RF communication circuit configured to generate tracking information; and
a battery formed on the flexible substrate and comprising a cathode layer and an anode layer, with a battery pouch disposed on the interconnect layer, the battery pouch containing electrochemical components of the battery.

2. The wireless tracking label tape of claim 1, wherein the wireless RF communication processor is a Bluetooth processor and the wireless RF communication circuit is a Bluetooth communication circuit, and the wireless RF communication processor and the wireless RF communication circuit are configured to generate broadcast beacons at a broadcast frequency.

3. The wireless tracking label tape of claim 1, wherein the battery is coated onto the interconnect layer.

4. The wireless tracking label tape of claim 1, wherein the battery is a layered structure.

5. The wireless tracking label tape of claim 1, wherein the battery is printed onto the interconnect layer.

6. The wireless tracking label tape of claim 1, wherein the wireless RF communication processor and the wireless RF communication circuit are configured to stay in a power-saving sleep mode during storage until activated for use.

7. The wireless tracking label tape of claim 1, wherein the wireless tracking label tape is formed in a reel-to-reel process with the wireless RF communication processor and the wireless RF communication circuit of at least one individual wireless tracking label is activated subsequent to separation from a reel.

8. The wireless tracking label tape of claim 1, wherein the wireless tracking label tape includes a coil antenna tuned to resonate at a wake up frequency and generate a wake up voltage in response to engaging with a device having a transceiver emitting a wireless signal at the wake up frequency.

9. The wireless tracking label tape of claim 1, wherein the wireless tracking label tape includes a coil antenna to harvest energy from engaging with HF RFID or NFC reader and in response generate a wake up voltage for the wireless RF communication processor and the wireless RF communication circuit.

10. The wireless tracking label tape of claim 1, wherein the wireless RF communication processor is configured to:
receive an electrical signal;
determine a rate of change of the electrical signal; and
modulate a broadcast frequency, at least in part, based on the determined rate of change of the electrical signal.

11. A wireless tracking label tape, comprising:
a flexible substrate;
an interconnect layer formed on the flexible substrate and patterned to electrically couple a plurality of electrical circuits including a wireless RF communication processor and a wireless RF communication circuit configured to generate tracking information; and
a battery printed onto the interconnect layer and comprising a cathode layer and an anode layer, with a battery pouch disposed on the interconnect layer, the battery pouch containing electrochemical components of the battery; and
wherein the wireless tracking label tape is formed in a reel-to-reel process with the wireless RF communication processor and the wireless RF communication circuit of at least one individual wireless tracking label activated subsequent to separation from a reel.

12. The wireless tracking label tape of claim 11, wherein the wireless tracking label tape includes a coil antenna tuned to resonate at a wake up frequency and generate a wake up voltage in response to engaging with a user device having a transceiver emitting a wireless signal at the wake up frequency.

13. The wireless tracking label tape of claim 11, wherein the wireless tracking label tape includes a coil antenna to harvest energy from engaging with an HF RFID or an NFC reader and in response generate a wake up voltage for the wireless RF communication processor and the wireless RF communication circuit.

14. The wireless tracking label tape of claim 11, wherein the wireless RF communication processor and the wireless RF communication circuit comprises a Bluetooth processor and a Bluetooth communication circuit configured to generate broadcast beacons at a broadcast frequency.

15. A wireless tracking label tape, comprising:
a flexible substrate;
an interconnect layer formed on the flexible substrate and patterned to electrically couple a plurality of electrical circuits including a RF communication processor and a RF communication circuit configured to generate broadcast beacons at a broadcast frequency;
a battery formed on the flexible substrate and comprising a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$; and
wherein the battery comprises at least two electrochemical cells in series formed by a planar process with vertical flow of ions in each electrochemical cell with a planar conductive layer coupling the two electrochemical cells in series.

16. The wireless tracking label tape, of claim 15, wherein the interconnect layer comprises an aluminum layer.

17. The wireless tracking label tape of claim 15, wherein the wireless tracking label tape is formed in a reel-to-reel process with the RF communication processor and the RF communication circuit of at least one individual wireless tracking label activated subsequent to separation from a reel.

18. The wireless tracking label tape of claim 15, wherein the wireless tracking label tape includes coil antenna tuned to resonate at a wake up frequency and generate a wake up voltage in response to engaging with a user device having a transceiver emitting a wireless signal at the wake up frequency.

19. A wireless tracking label tape, comprising:
a flexible substrate;
an interconnect layer formed on the flexible substrate and patterned to electrically couple a plurality of electrical circuits including a RF communication processor and a RF communication circuit configured to generate broadcast beacons at a broadcast frequency;
a battery formed on the flexible substrate and comprising a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$; and
wherein the battery comprises at least two electrochemical cells in series formed by a coplanar process with each electrochemical cell having a lateral flow of ions between an interdigitated cathode and anode, with a planar conductive layer coupling the two electrochemical cells in series.

20. The wireless tracking label tape of claim 15, wherein the RF communication processor and the RF communication circuit are configured to stay in a power-saving sleep mode during storage until activated for use.

21. The wireless tracking label tape, of claim 19, wherein the interconnect layer comprises an aluminum layer.

22. The wireless tracking label tape of claim 19, wherein the RF communication processor and the RF communication circuit are configured to stay in a power-saving sleep mode during storage until activated for use.

23. The wireless tracking label tape of claim 19 wherein the wireless tracking label tape is formed in a reel-to-reel process with the RF communication processor and the RF communication circuit of at least one individual wireless tracking label activated subsequent to separation from a reel.

24. The wireless tracking label tape of claim 19, wherein the wireless tracking label tape includes coil antenna tuned to resonate at a wake up frequency and generate a wake up voltage in response to engaging with a user device having a transceiver emitting a wireless signal at the wake up frequency.

25. A wireless tracking label tape, comprising:
a flexible substrate;
an interconnect layer formed on the flexible substrate and patterned to electrically couple a plurality of electrical circuits including a RF communication processor and a RF communication circuit configured to generate broadcast beacons at a broadcast frequency;
a battery formed on the flexible substrate and comprising a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$; and wherein the battery comprises 3 electrochemical cells in series with an electrical trace formed on the flexible substrate electrically coupling a top layer to a bottom layer.

26. The wireless tracking label tape, of claim 25, wherein the interconnect layer comprises an aluminum layer.

27. The wireless tracking label tape of claim 25, wherein the RF communication processor and the RF communication circuit are configured to stay in a power-saving sleep mode during storage until activated for use.

28. The wireless tracking label tape of claim 25, wherein the wireless tracking label tape is formed in a reel-to-reel process with the RF communication processor and the RF communication circuit of at least one individual wireless tracking label activated subsequent to separation from a reel.

29. The wireless tracking label tape of claim 25, wherein the wireless tracking label tape includes coil antenna tuned to resonate at a wake up frequency and generate a wake up voltage in response to engaging with a user device having a transceiver emitting a wireless signal at the wake up frequency.

* * * * *